(12) United States Patent
Cohen et al.

(10) Patent No.: US 12,518,189 B2
(45) Date of Patent: *Jan. 6, 2026

(54) MODULAR AND DYNAMIC DIGITAL CONTROL IN A QUANTUM CONTROLLER

(71) Applicant: Quantum Machines, Tel Aviv (IL)

(72) Inventors: Yonatan Cohen, Tel Aviv (IL); Nissim Ofek, Tel Aviv (IL); Itamar Sivan, Tel Aviv (IL)

(73) Assignee: Q.M Technologies Ltd (IL)

( * ) Notice: Subject to any disclaimer, the term of this patent is extended or adjusted under 35 U.S.C. 154(b) by 106 days.

This patent is subject to a terminal disclaimer.

(21) Appl. No.: 18/503,521

(22) Filed: Nov. 7, 2023

(65) Prior Publication Data

US 2024/0289670 A1 Aug. 29, 2024

Related U.S. Application Data

(63) Continuation of application No. 17/491,765, filed on Oct. 1, 2021, now Pat. No. 11,868,849, which is a
(Continued)

(51) Int. Cl.
*B82Y 10/00* (2011.01)
*G06N 10/40* (2022.01)

(52) U.S. Cl.
CPC .............. *G06N 10/40* (2022.01); *B82Y 10/00* (2013.01)

(58) Field of Classification Search
CPC ..................................................... G06N 10/40
See application file for complete search history.

(56) References Cited

U.S. PATENT DOCUMENTS

| 4,875,484 A | 10/1989 | Anzai et al. |
| 5,063,354 A | 11/1991 | Lauper et al. |

(Continued)

FOREIGN PATENT DOCUMENTS

| CA | 2420022 A1 | 2/2003 |
| CN | 1808103 A | 7/2006 |

(Continued)

OTHER PUBLICATIONS

U.S. Appl. No. 62/294,966, filed Feb. 12, 2016.
(Continued)

*Primary Examiner* — Matthew L Reames
(74) *Attorney, Agent, or Firm* — McAndrews, Held & Malloy, Ltd.

(57) ABSTRACT

A quantum controller comprises a quantum control pulse generation circuit and digital signal management circuit. The quantum control pulse generation circuit is operable to generate a quantum control pulse which can be processed by any of a plurality of controlled circuits, and generate a first digital signal which can be routed to any of the plurality of controlled circuits. The digital signal management circuit is operable to detect, during runtime, to which one or more of the plurality of controlled circuits the first digital signal is to be routed, to manipulate the first digital signal based on the one or more of the plurality of controlled circuits to which the first digital signal is to be routed, where the manipulation results in one or more manipulated digital signals, and to route the one or more manipulated digital signals to one or more of the plurality of controlled circuits.

20 Claims, 9 Drawing Sheets

Related U.S. Application Data continuation of application No. 16/401,153, filed on May 2, 2019, now Pat. No. 11,164,100.

(56) References Cited

U.S. PATENT DOCUMENTS

| | | | |
|---|---|---|---|
| 5,194,907 | A | 3/1993 | Hayashi |
| 6,223,228 | B1 | 4/2001 | Ryan et al. |
| 6,426,984 | B1 | 7/2002 | Perino et al. |
| 6,993,108 | B1 | 1/2006 | Chi et al. |
| 7,451,292 | B2 | 11/2008 | Routt |
| 7,535,931 | B1 | 5/2009 | Zampetti et al. |
| 7,627,126 | B1 | 12/2009 | Pikalo |
| 8,315,969 | B2 | 11/2012 | Roetteler |
| 8,385,878 | B2 | 2/2013 | Rao |
| 8,750,717 | B1 | 6/2014 | Yap et al. |
| 9,207,672 | B2 | 12/2015 | Williams |
| 9,400,499 | B2 | 7/2016 | Williams |
| 9,509,324 | B2 | 11/2016 | McDonald et al. |
| 9,663,358 | B1 | 5/2017 | Cory et al. |
| 9,692,423 | B2 | 6/2017 | McDermott, III |
| 9,847,121 | B2 | 12/2017 | Frank |
| 9,858,531 | B1 | 1/2018 | Monroe |
| 9,892,365 | B2 | 2/2018 | Rigetti |
| 9,978,020 | B1 | 5/2018 | Gambetta |
| 9,979,400 | B1 | 5/2018 | Sete |
| 9,996,801 | B2 | 6/2018 | Shim |
| 10,063,228 | B2 | 8/2018 | Deurloo et al. |
| 10,122,351 | B1 | 11/2018 | Naaman |
| 10,127,499 | B1 | 11/2018 | Rigetti |
| 10,192,168 | B2 | 1/2019 | Rigetti |
| 10,223,643 | B1 | 3/2019 | Bishop et al. |
| 10,333,503 | B1 | 6/2019 | Cohen et al. |
| 10,454,459 | B1 | 10/2019 | Cohen |
| 10,496,069 | B2 | 12/2019 | Nazarathy et al. |
| 10,505,524 | B1 | 12/2019 | Cohen |
| 10,560,076 | B1 | 2/2020 | Cohen |
| 10,637,449 | B1 | 4/2020 | Cohen et al. |
| 10,659,018 | B1 | 5/2020 | Cohen |
| 10,666,238 | B1 | 5/2020 | Cohen |
| 10,958,253 | B1 | 3/2021 | Cohen et al. |
| 10,985,739 | B2 | 4/2021 | Cohen et al. |
| 11,010,145 | B1 | 5/2021 | Smith et al. |
| 11,463,075 | B2 | 10/2022 | Cohen et al. |
| 11,616,497 | B2 | 3/2023 | Cohen et al. |
| 11,616,498 | B2 | 3/2023 | Cohen et al. |
| 11,868,849 | B2 * | 1/2024 | Cohen ............... G06N 10/40 |
| 2002/0004876 | A1 | 1/2002 | Timmer et al. |
| 2004/0266084 | A1 | 12/2004 | Fujishima et al. |
| 2005/0015422 | A1 | 1/2005 | Kohn et al. |
| 2005/0180575 | A1 | 8/2005 | Maeda et al. |
| 2006/0093376 | A1 | 5/2006 | Mitchell et al. |
| 2008/0037693 | A1 | 2/2008 | Andrus et al. |
| 2010/0072979 | A1 | 3/2010 | Fefer et al. |
| 2011/0035511 | A1 | 2/2011 | Biederman |
| 2013/0198499 | A1 | 8/2013 | Dice et al. |
| 2016/0125311 | A1 | 5/2016 | Fuechsle et al. |
| 2016/0267032 | A1 | 9/2016 | Rigetti et al. |
| 2016/0292586 | A1 | 10/2016 | Rigetti et al. |
| 2017/0094618 | A1 | 3/2017 | Bjorkengren |
| 2017/0214410 | A1 | 7/2017 | Hincks et al. |
| 2017/0364796 | A1 | 12/2017 | Wiebe |
| 2018/0013426 | A1 | 1/2018 | Deurloo et al. |
| 2018/0032893 | A1 | 2/2018 | Epstein |
| 2018/0091244 | A1 | 3/2018 | Abdo |
| 2018/0107579 | A1 | 4/2018 | Chapman |
| 2018/0123597 | A1 | 5/2018 | Sete |
| 2018/0237039 | A1 | 8/2018 | Mong et al. |
| 2018/0260245 | A1 | 9/2018 | Smith |
| 2018/0260730 | A1 | 9/2018 | Reagor |
| 2018/0260732 | A1 | 9/2018 | Bloom |
| 2018/0308007 | A1 | 10/2018 | Amin |
| 2018/0322409 | A1 | 11/2018 | Barends |
| 2018/0365585 | A1 | 12/2018 | Smith |
| 2018/0373995 | A1 | 12/2018 | Tomaru et al. |
| 2018/0375650 | A1 | 12/2018 | Legre |
| 2019/0042964 | A1 | 2/2019 | Elsherbini et al. |
| 2019/0042965 | A1 | 2/2019 | Clarke |
| 2019/0042970 | A1 | 2/2019 | Zou |
| 2019/0042971 | A1 | 2/2019 | Zou |
| 2019/0042972 | A1 | 2/2019 | Zou |
| 2019/0042973 | A1 | 2/2019 | Zou |
| 2019/0049495 | A1 | 2/2019 | Ofek |
| 2019/0251478 | A1 | 8/2019 | Bishop et al. |
| 2019/0266512 | A1 | 8/2019 | Shen et al. |
| 2019/0302832 | A1 | 10/2019 | Morgan et al. |
| 2019/0317589 | A1 | 10/2019 | Mathur et al. |
| 2019/0385088 | A1 | 12/2019 | Naaman et al. |
| 2020/0293080 | A1 | 9/2020 | Poon et al. |
| 2020/0364602 | A1 | 11/2020 | Niu et al. |
| 2021/0004707 | A1 | 1/2021 | Gambetta et al. |
| 2021/0103847 | A1 | 4/2021 | Akzam |
| 2021/0125096 | A1 | 4/2021 | Puri et al. |
| 2021/0359670 | A1 | 11/2021 | Cohen et al. |

FOREIGN PATENT DOCUMENTS

| | | |
|---|---|---|
| CN | 104467843 A | 3/2015 |
| CN | 105281886 A | 1/2016 |
| CN | 105912070 A | 8/2016 |
| CN | 107408223 A | 11/2017 |
| CN | 108111306 A | 6/2018 |
| CN | 108594214 A | 9/2018 |
| CN | 108698815 A | 10/2018 |
| CN | 109165744 A | 1/2019 |
| CN | 110085094 A | 8/2019 |
| CN | 108780129 A | 11/2019 |
| CN | 110677210 A | 1/2020 |
| CN | 111464154 A | 7/2020 |
| CN | 111767055 A | 10/2020 |
| CN | 112019193 A | 12/2020 |
| CN | 112149832 A | 12/2020 |
| EP | 0388052 A2 | 9/1990 |
| JP | 2007049009 A | 2/2007 |
| JP | 2011175078 A | 9/2011 |
| JP | 2012188875 A | 10/2012 |
| WO | 2015178991 A2 | 11/2015 |
| WO | 2015178992 A2 | 11/2015 |
| WO | 2017078735 A1 | 5/2017 |
| WO | 2017123940 A | 7/2017 |
| WO | 2017139683 A1 | 8/2017 |
| WO | 2018055607 A1 | 3/2018 |
| WO | 2018062991 A1 | 4/2018 |
| WO | 2019063117 A1 | 4/2019 |
| WO | 2020033807 A1 | 2/2020 |
| WO | 2020231795 A1 | 11/2020 |
| WO | 2021123903 A1 | 6/2021 |

OTHER PUBLICATIONS

Int'l Search Report and Written Opinion Appln No. PCT/IB2019/001410 mailed Jun. 10, 2020.

Int'l Search Report and Written Opinion Appln No. PCT/IB2019/001394 mailed Jun. 17, 2020.

Zhang J, Hegde SS, Suter D. Pulse sequences for controlled 2-and 3-qubit gates in a hybrid quantum register. arXiv preprint arXiv:1806.08408. Jun. 21, 2018.

Wang CY, Kuznetsova L, Gkortsas VM, Diehl L, Kaertner FX, Belkin MA, Belyanin A, Li X, Ham D, Schneider H, Grant P. Mode-locked pulses from mid-infrared quantum cascade lasers. Optics Express. Jul. 20, 2009;17(15):12929-43.

Int'l Search Report and Written Opinion Appln No. PCT/IB2020/000218 mailed Aug. 11, 2020.

Quan R, Zhai Y, Wang M, Hou F, Wang S, Xiang X, Liu T, Zhang S, Dong R. Demonstration of quantum synchronization based on second-order quantum coherence of entangled photons. Scientific reports. Jul. 25, 2016;6:30453. Jul. 25, 2016 (Jul. 25, 2016).

Int'l Search Report and Written Opinion Appln No. PCT/IB2020/000376 mailed Sep. 17, 2020.

Breitfelder et al. eds., IEEE 100: The Authoritative Dictionary of IEEE Standards Terms 1247, definition 2 of "variable" (7th ed. 2000). (Year: 2000).

(56) References Cited

OTHER PUBLICATIONS

Int'l Search Report and Written Opinion Appln No. PCT/IB2020/000707 mailed Jan. 12, 2021.
National Academies of Sciences, Engineering, and Medicine. "Quantum Computing: Progress and Prospects". eprint (Dec. 2018) [online]. [retrieved on Jan. 7, 2020]. retrieved from: <https://doi.org/10.17226/25196.> Dec. 4, 2018 (Dec. 4, 2018) pp. 114, 142, 210, Fig. 2.5, Qiskit Backend Specifications at footnote 57: section 4.2, 5.1.5, Fig. 3, Fig. 4 , pp. 30, 57.
IBM Research. "Qiskit Backend Specifications for OpenQASM and OpenPulse Experiments". eprint arXiv:1809.03452v1 (Sep. 10, 2018) [online]. [retrieved on Jan. 7, 2020]. retrieved from: <https://arxiv.org/pdf/1809.03452.pdf> Sep. 10, 2018 (Sep. 10, 2018) section 4.2, 5.1.5, Fig. 3, Fig. 4 , pp. 30, 57.
Int'l Search Report and Written Opinion Appln No. PCT/IB2020/000704 mailed Jan. 17, 2021.
Wolfowicz, et al. Pulse Techniques for Quantum Information Processing University of Chicago, University College London, eMagRes, 2016, vol. 5: 1515-1528. DOI 10.1002/9780470034590.emrstm1521.
Int'l Search Report and Written Opinion Appln No. PCT/IB2020/000555 mailed Dec. 27, 2020.
Int'l Search Report and Written Opinion Appln No. PCT/IB2020/000760 mailed Jan. 27, 2021.
"Quantum-classical interface based on single flux quantum digital logic". In: Quantum Science and Technology 3.2 (2018), pp. 1-16. DOI: 10.1088/2058-9565/aaa3a0.(retrieved on Jan. 20, 2021). Retrieved from the Internet: <https://arxiv.org/pdf/1710.04645.pdf > Mcdermott R. et al. Oct. 12, 2017 (Oct. 12, 2017) Section VI, VII, VIII.
Roffe, J., Quantum Error Correction: An Introductory Guide, Dept. of Physics & Astronomy, Univ. of Sheffeld, UK, Oct. 10, 2019, pp. 1-29.
Int'l Search Report and Written Opinion Appln No. PCT/IB2020/001004 mailed May 13, 2021.
Int'l Preliminary Report on Patentability Appln No. PCT/IB2019/001410 mailed Jun. 10, 2021.
Int'l Search Report and Written Opinion Appln No. PCT/IB2021/000067 mailed Jun. 21, 2021.
Int'l Preliminary Report on Patentability Appln No. PCT/IB2019/001394 mailed Jul. 29, 2021.
Int'l Preliminary Report on Patentability Appln No. PCT/IB2020/000218 mailed Sep. 16, 2021.
Int'l Preliminary Report on Patentability Appln No. PCT/IB2020/000376 mailed Nov. 12, 2021.
Int'l Search Report and Written Opinion Appln No. PCT/IB2021/056254 mailed Dec. 1, 2021.
Ribeiro, Diogo C., Pedro M. Cruz, and Nuno Borges Carvalho, "Towards a denser frequency grid in phase measurements using mixer-based receivers." 2015 85th Microwave Measurement Conference (ARFTG). IEEE, 2015. Dec. 31, 2015 (Dec. 31, 2015).
Int'l Preliminary Report on Patentability Appln No. PCT/IB2020/000555 mailed Feb. 10, 2022.
Int'l Preliminary Report on Patentability Appln No. PCT/IB2020/000707 mailed Mar. 17, 2022.
Int'l Preliminary Report on Patentability Appln No. PCT/IB2020/000704 mailed Mar. 17, 2022.
Int'l Preliminary Report on Patentability Appln No. PCT/IB2020/000760 mailed Apr. 7, 2022.
Int'l Search Report and Written Opinion Appln No. PCT/IB2022/050190 mailed Apr. 11, 2022.
Int'l Search Report and Written Opinion Appln No. PCT/IB2022/000059 mailed Jul. 7, 2022.
Moreira , "QuTech Central Controller: A Quantum Control Architecture for a Surface-17 Logical Qubit." Delft University of Technology Student Theses Collection (2019). Available at the following URL: http://resolver.tudelft.nl/uuid:502ed5e5-87f7-42bd-a077-c24b7281cd94 May 10, 2019 (May 10, 2019).
Int'l Preliminary Report on Patentability Appln No. PCT/IB2020/001004 mailed Jun. 30, 2022.
Int'l Search Report and Written Opinion Appln No. PCT/IB2022/000024 mailed Jul. 18, 2022.
Baier, Simon, Matteo Pompili, Sophie LN Hermans, Hans KC Beukers, Peter C. Humphreys, Raymond N. Schouten, Raymond FL Vermeulen et al. "Realization of a Multi-Node Quantum Network of Remote Solid-State Qubits", Science, vol. 372, pp. 259-264 (2021) Baier Simon Apr. 16, 2021 (Apr. 16, 2021).
Int'l Search Report and Written Opinion Appln No. PCT/IB2022/000068 mailed Jul. 17, 2022.
D. Copsey et al., "Toward a scalable, silicon-based quantum computing architecture," in IEEE Journal of Selected Topics in Quantum Electronics, vol. 9, No. 6, pp. 1552-1569, Nov.-Dec. 2003, doi: 10.1109/JSTQE.2003.820922. Dec. 31, 2003 (Dec. 31, 2003).
Extended European Search Report Appln No. 19889443.8 dated Aug. 4, 2022.
Int'l Search Report and Written Opinion Appln No. PCT/IB2022/054903 mailed Sep. 8, 2022.
Int'l Preliminary Report on Patentability Appln No. PCT/IB2021/000067 mailed Sep. 22, 2022.
Int'l Search Report and Written Opinion Appln No. PCT/IB2022/053304 mailed Oct. 6, 2022.
Serrano, Javier, M. Lipinski, T. Wlostowski, E. Gousiou, Erik van der Bij, M. Cattin, and G. Daniluk. "The white rabbit project." (2013) Sep. 19, 2013 (Sep. 19, 2013) Entire document.
Extended European Search Report Appln No. 19910800.2 dated Oct. 6, 2022.
Hornibrook J M et al: "Cryogenic Control Architecture for Large-Scale Quantum Computing", arxiv.org, Cornell University Library, 201 Olin Library Cornell University Ithaca, NY 14853, Sep. 8, 2014 (Sep. 8, 2014), XP081391509.
Fu X et al: "An Experimental Microarchitecture for a Superconducting Quantum Processor", MICRO-50 '17: Proceedings of the 50th Annual IEEE/ACM International Symposium on Microarchitecture, Cornell University Library, 201 Olin Library Cornell University Ithaca, NY 14853, Oct. 14, 2017 (Oct. 14, 2017), pp. 1-13, XP081291220.
Zopes J. et al: "High resolution quantum sensing with shaped control pulses", arxiv.org, Cornell University Library, 201 Olin Library Cornell University Ithaca, NY 14853, May 22, 2017 (May 22, 2017), XP081276850.
Cross et al. "Open Quantum Assembly Language", Jan. 10, 2017.
European Office Communication with extended Search Report Appln No. 20766036.6 dated Nov. 24, 2022.
Japanese Patent Office Action Appln No. 2021-529723 dated Oct. 26, 2022 with translation.
Lavoie et al., "A Formalization for Specifying and Implementing Correct Pull-Stream Modules," in arXiv preprint arXiv:1801.06144 (2018). (Year: 2018).
Fu et al., "A Microarchitecture for a Superconducting Quantum Processor," in 38.3 I EEE Micro 40-47 (2018). (Year: 2018).
Extended European Search Report Appln No. 20845965.1 dated Jun. 29, 2023.
European Office Communication with extended Search Report Appln No. 20861242.4 dated Jul. 7, 2023.
European Office Communication with extended Search Report Appln No. 23153085.8 dated Jul. 3, 2023.
Yang yet al: "FPGA-based electronic system for the control and readout of superconducting qubit systems", arxiv.org, Cornell University Library, 201 Yang yet al: "FPGA-based electronic system for the control and readout of superconducting qubit systems", arxiv.org, Cornell University Library, 201 Olin Library Cornell University Ithaca, NY 14853, Oct. 15, 2021 (Oct. 15, 2021), XP091078848.
Gebauer Richard et al: "A modular RFSoC-based approach to interface superconducting quantum bits", 2021 International Conference on Field-Programmable Technology (ICFPT), IEEE, Dec. 6, 2021 (Dec. 6, 2021), pp. 1-9, XP034028257, DOI: 10.1109/ICFPT52863.2021.9609909 [retrieved on Nov. 8, 2021].
European Office Communication with extended Search Report Appln No. 20861100.4 dated Jul. 21, 2023.
Fu et al. "eQASM: An Executable Quantum 1-15 Instruction Set Architecture", 2019 IEEE International Symposium on High Performance Computer Architecture (HPCA), IEEE Feb. 16, 2019 (Feb. 16, 2019), pp. 224-237, XP033532496, DOI: 10.1109/HPCA.

(56) References Cited

OTHER PUBLICATIONS 2019.00040 Retrieved from the Internet: URL: https://ieeexplore.ieee.org/abstract/document/8675197/authors#authors [retrieved on Mar. 26, 2019].

Yunong Shi et al: "Optimized Compilation of Aggregated Instructions for Realistic Quantum Computers", arxiv.org, Cornell University Library, 201 Olin Library Cornell University Ithaca, NY 14853, Feb. 4, 2019 (Feb. 4, 2019), XP081025321, DOI: 10.1145/3297858.3304018.

Chinese Patent Office Action Appln No. 2019800888907 with search report dated Jul. 28, 2023 with translation.

European Office Communication with extended Search Report Appln No. 20869503.1 dated Sep. 12, 2023.

Chinese Patent Office Action Appln No. 2019800902340 with search report dated Aug. 30, 2023 with translation.

Int'l Preliminary Report on Patentability Appln No. PCT/IB2022/050190 mailed Oct. 19, 2023.

\* cited by examiner

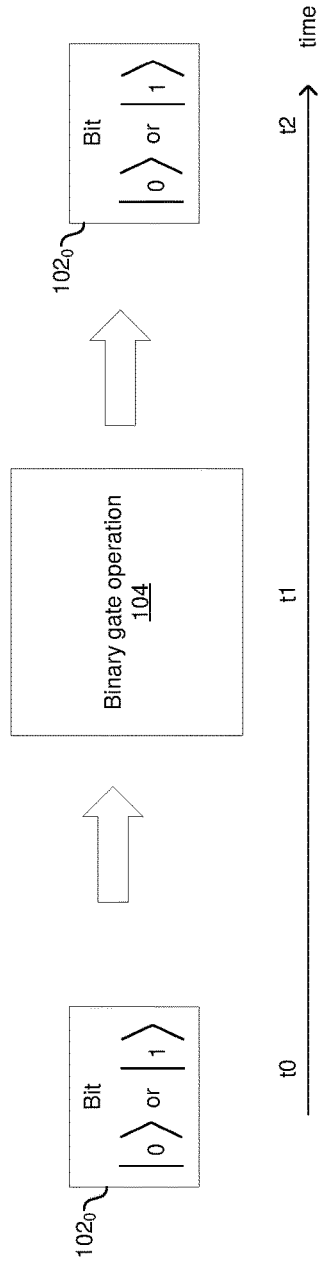
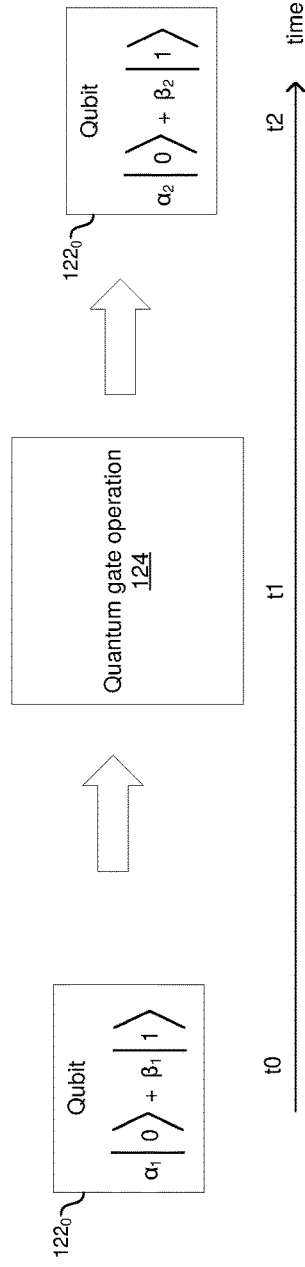

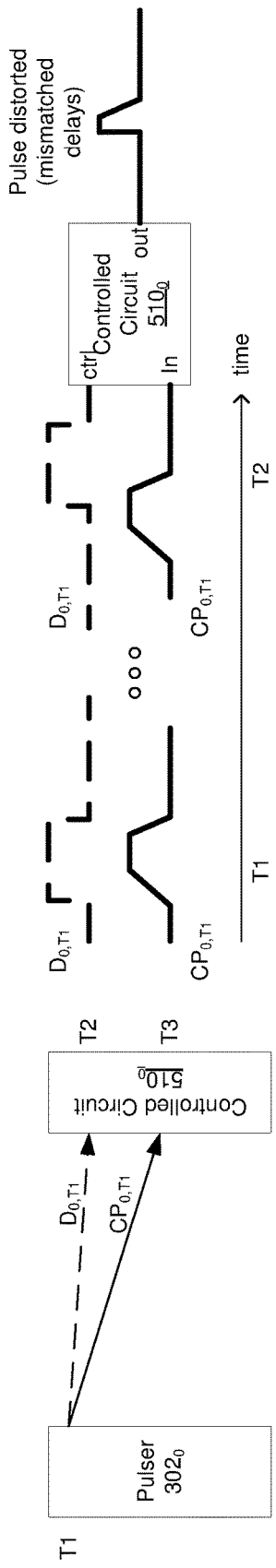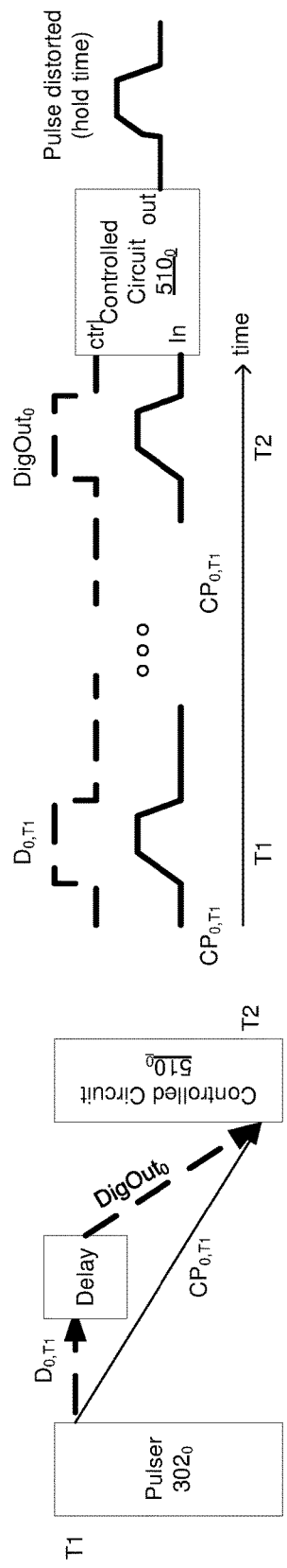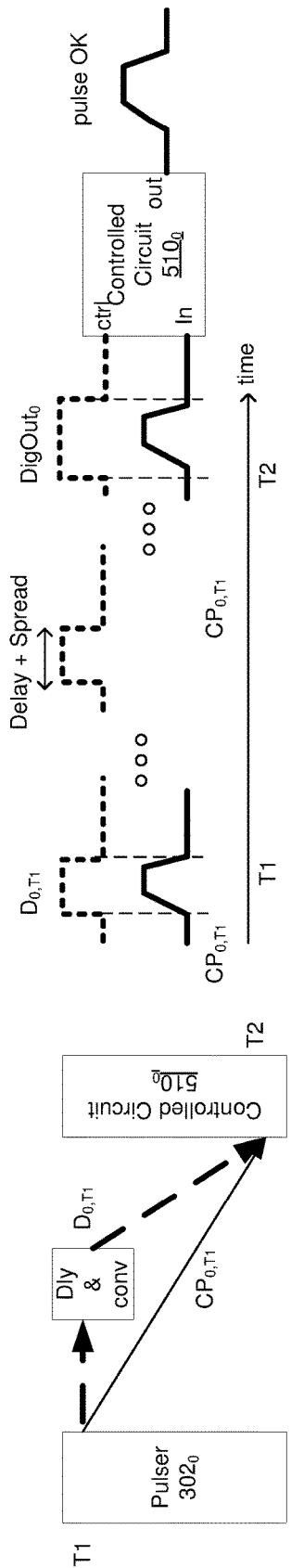
FIG. 8A
FIG. 8B
FIG. 8C

MODULAR AND DYNAMIC DIGITAL CONTROL IN A QUANTUM CONTROLLER

This application is a continuation of application Ser. No. 17/491,765 filed Oct. 1, 2021, which is a continuation of application Ser. No. 16/401,153 filed May 2, 2019, (U.S. Pat. No. 11,164,100). The aforementioned documents are hereby incorporated herein by reference in their entirety.

BACKGROUND

Limitations and disadvantages of conventional approaches to quantum computer control systems will become apparent to one of skill in the art, through comparison of such approaches with some aspects of the present method and system set forth in the remainder of this disclosure with reference to the drawings.

BRIEF SUMMARY

Methods and systems are provided for modular and dynamic digital control in a quantum controller, substantially as illustrated by and/or described in connection with at least one of the figures, as set forth more completely in the claims.

BRIEF DESCRIPTION OF THE DRAWINGS

FIGS. 1A and 1B compare some aspects of classical (binary) computing and quantum computing.

FIGS. 8A and 8B illustrate problems that can arise when a quantum control pulse needs a digital control signal to condition the signal path traveled by the quantum control pulse in route to its destination.

FIG. 8C illustrates manipulation of a digital control signal that accompanies a quantum control pulse, in accordance with an example implementation of this disclosure.

DETAILED DESCRIPTION

Figure 2:
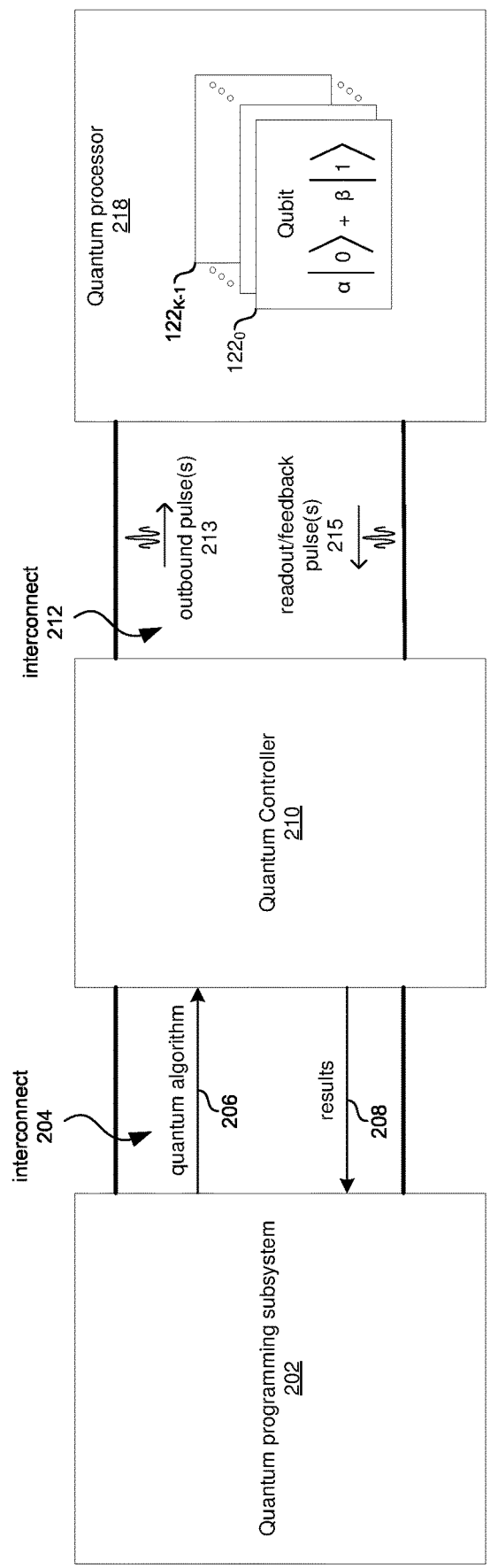
FIG. 2 shows an example quantum computing system.

Classical computers operate by storing information in the form of binary digits ("bits") and processing those bits via binary logic gates. At any given time, each bit takes on only one of two discrete values: 0 (or "off") and 1 (or "on"). The logical operations performed by the binary logic gates are defined by Boolean algebra and circuit behavior is governed by classical physics. In a modern classical system, the circuits for storing the bits and realizing the logical operations are usually made from electrical wires that can carry two different voltages, representing the 0 and 1 of the bit, and transistor-based logic gates that perform the Boolean logic operations.

Shown in FIG. 1A is a simple example of a classical computer configured to a bit 102 and apply a single logic operation 104 to the bit 102. At time to the bit 102 is in a first state, at time t1 the logic operation 104 is applied to the bit 102, and at time t2 the bit 102 is in a second state determined by the state at time to and the logic operation. So, for example, the bit 102 may typically be stored as a voltage (e.g., 1 Vdc for a "1" or 0 Vdc for a "0") which is applied to an input of the logic operation 104 (comprised of one or more transistors). The output of the logic gate is then either 1 Vdc or 0 Vdc, depending on the logic operation performed.

Obviously, a classical computer with a single bit and single logic gate is of limited use, which is why modern classical computers with even modest computation power contain billions of bits and transistors. That is to say, classical computers that can solve increasingly complex problems inevitably require increasingly large numbers of bits and transistors and/or increasingly long amounts of time for carrying out the algorithms. There are, however, some problems which would require an infeasibly large number of transistors and/or infeasibly long amount of time to arrive at a solution. Such problems are referred to as intractable.

Quantum computers operate by storing information in the form of quantum bits ("qubits") and processing those qubits via quantum gates. Unlike a bit which can only be in one state (either 0 or 1) at any given time, a qubit can be in a superposition of the two states at the same time. More precisely, a quantum bit is a system whose state lives in a two dimensional Hilbert space and is therefore described as a linear combination $\alpha|0\rangle + \beta|1\rangle$, where $|0\rangle$ and $|1\rangle$ are two basis states, and $\alpha$ and $\beta$ are complex numbers, usually called probability amplitudes, which satisfy $|\alpha|^2 + |\beta|^2 = 1$. Using this notation, when the qubit is measured, it will be 0 with probability $|\alpha|^2$ and will be 1 with probability $|\beta|^2$. $|0\rangle$ and $|1\rangle$ can also be represented by two-dimensional basis vectors $$\begin{bmatrix}1\\0\end{bmatrix} \text{ and } \begin{bmatrix}0\\1\end{bmatrix},$$

respectively, and then the qubit state is represented by $$\begin{bmatrix}\alpha\\\beta\end{bmatrix}.$$

The operations performed by the quantum gates are defined by linear algebra over Hilbert space and circuit behavior is governed by quantum physics. This extra richness in the mathematical behavior of qubits and the operations on them, enables quantum computers to solve some problems much faster than classical computers (in fact some problems that are intractable for classical computers may become trivial for quantum computers).

Shown in FIG. 1B is a simple example of a quantum computer configured to store a qubit 122 and apply a single quantum gate operation 124 to the qubit 122. At time to the qubit 122 is described by $\alpha_1|0\rangle + \beta_1|1\rangle$, at time t1 the logic operation 104 is applied to the qubit 122, and at time t2 the qubits 122 is described by $\alpha_2|0\rangle + \beta_2|1\rangle$.

Unlike a classical bit, a qubit cannot be stored as a single voltage value on a wire. Instead, a qubit is physically realized using a two-level quantum mechanical system. Many physical implementations of qubits have been proposed and developed over the years with some being more promising than others. Some examples of leading qubits implementations include superconducting circuits, spin qubits, and trapped ions.

It is the job of the quantum controller to generate the precise series of external signals, usually pulses of electromagnetic waves and pulses of base band voltage, to perform the desired logic operations (and thus carry out the desired quantum algorithm). Example implementations of a quantum controller are described in further detail below.

FIG. 2 shows an example quantum computing system. The system comprises a quantum programming subsystem 202, a quantum controller 210, and a quantum processor 218.

The quantum programming subsystem 202 comprises circuitry operable to generate a quantum algorithm description 206 which the quantum controller 210 can execute to carry out the quantum algorithm on the quantum processor 218 (i.e., generate the necessary outbound quantum pulse(s) 213) with little or no human intervention during runtime of the algorithm. In an example implementation, the quantum programming system 202 is a personal computer having installed on it a quantum controller software development kit (SDK) that enables a user to generate the quantum algorithm description 206 using a programming language. In an example implementation, the programming language may be a low-level language which has little or no abstraction from the instruction set used by the specific hardware of the quantum controller 210. Such instructions may be converted to machine code of the quantum controller 210 without need of a compiler or interpreter. In an example implementation, the programming language may be a high-level language which is much more abstracted from the particular hardware of the quantum controller 210. Such instructions may be compiled into machine code before they can be run on the quantum controller 210. In an example implementation the description 206 may be a machine code description of the quantum algorithm. In an example implementation, the description 206 may be a high-level description which the quantum controller 210 may itself compile into machine code. In an example implementation, the description 206 may be a high-level description which the quantum controller 210 may interpret into machine code during runtime. In an example implementation, an operating system or other software layer may run on the quantum controller 210 and the quantum algorithm description 206 may be software instructions that make use of an application programming interface (API) of the software running on the quantum controller 210.

The quantum programming subsystem 202 is coupled to the quantum controller 210 via interconnect 204 which may, for example, utilize universal serial bus (USB), peripheral component interconnect (PCIe) bus, wired or wireless Ethernet, or any other suitable communication protocol.

The quantum controller 210 comprises circuitry operable to load the quantum algorithm description 206 and then perform the quantum algorithm as per the quantum algorithm description 206. In an example implementation, quantum algorithm description 206 is machine code (i.e., series of binary vectors that represent instructions that the quantum controller's hardware can interpret and execute directly) which is loaded into the quantum controller 210. Then, execution of the machine code by the quantum controller 210 causes the quantum controller 210 to generate the necessary outbound quantum control pulse(s) 213 that correspond to the desired operations to be performed on the quantum processor 218 (e.g., sent to qubit(s) for manipulating a state of the qubit(s) or to readout resonator(s) for reading the state of the qubit(s), etc.). Depending on the quantum algorithm to be performed, outbound pulse(s) 213 for carrying out the algorithm may be predetermined at design time and/or may need to be determined during runtime. The runtime determination of the pulses may comprise performance of classical calculations and processing in the quantum controller 210 and/or the quantum programing subsystem 202 during runtime of the algorithm (e.g., runtime analysis of inbound pulses 215 received from the quantum processor 218).

Upon completion of a quantum algorithm and/or during a runtime of a quantum algorithm by the quantum controller 210, the quantum controller 210 may output data/results 298 to the quantum programming subsystem 202. In an example implementation these results may be used to generate a new quantum algorithm description 206 for a subsequent run of the quantum algorithm and/or update the quantum algorithm description during runtime.

The quantum controller 210 is coupled to the quantum processor 218 via interconnect 212 which may comprise, for example, one or more conductors and/or optical fibers.

Figure 3A:
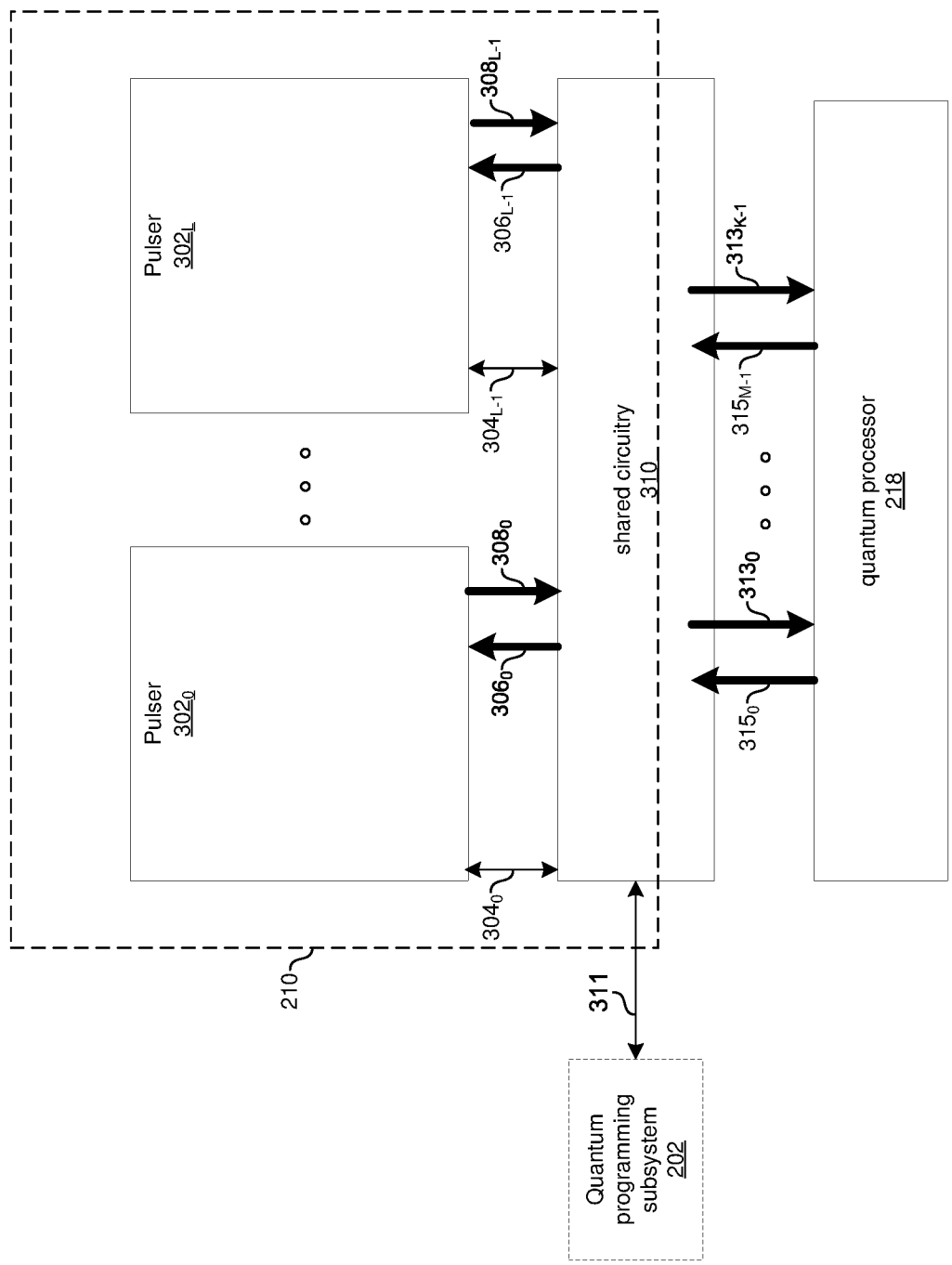
FIG. 3A shows an example quantum controller architecture in accordance with various example implementations of this disclosure.

The quantum processor 218 comprises K (an integer) quantum elements 122, which includes qubits (which could be of any type such as superconducting, spin qubits, ion trapped, etc.), and, where applicable, any other element(s) for processing quantum information, storing quantum information (e.g. storage resonator), and/or coupling the outbound quantum control pulses 213 and 215 between interconnect 212 and the quantum element(s) 122 (e.g., readout resonator(s)). In an example implementation in which the quantum processor comprises readout resonators (or other readout circuitry) K may be equal the total number of qubits plus the number of readout circuits. That is, if each of Q (an integer) qubits of the quantum processor 218 is associated with a dedicated readout circuit, then K may be equal to 2Q. For ease of description, the remainder of this disclosure will assume such an implementation, but it need not be the case in all implementations. Other elements of the quantum processor 218 may include, for example, flux lines (electronic lines for carrying current), gate electrodes (electrodes for voltage gating), current/voltage lines, amplifiers, classical logic circuits residing on-chip in the quantum processor 218, and/or the like FIG. 3A shows an example quantum controller architecture in accordance with various example implementations of this disclosure. The quantum controller 210 comprises L (an integer≥1) pulser circuits $302_0$-$302_{L-1}$ and shared circuitry 310.

In the example implementation shown, each pulser circuit $302_1$ (1 an integer between 0 and L−1) comprises circuitry for exchanging information over signal paths $304_1$, $306_1$, and $308_1$, where the signal path $308_1$ carries outbound pulses (e.g., 213 of FIG. 2) generated by the pulser circuit $302_1$ (which may be, for example, control pulses sent to the quantum processor 218 to manipulate one or more properties of one or more quantum elements—e.g., manipulate a state of one or more qubits, manipulate a frequency of a qubit using flux biasing, etc., and/or readout a state of one or more quantum elements), the signal path $306_1$ carries inbound quantum element readout pulses (e.g., 215 of FIG. 2) to be processed by the pulser circuit $302_1$, and signal path $304_1$ carries control information. Each signal path may comprise one or more conductors, optical channels, and/or wireless channels.

Each pulser circuit $302_1$ comprises circuitry operable to generate outbound pulses on signal path $308_1$ according to quantum control operations to be performed on the quantum processor 218. This involves very precisely controlling characteristics such as phase, frequency, amplitude, and timing of the outbound pulses. The characteristics of an outbound pulse generated at any particular time may be determined, at least in part, on inbound pulses received from the quantum processor 218 (via shared circuitry 310 and signal path $306_1$) at a prior time. In an example implementation, the time required to close the feedback loop (i.e., time from receiving a first pulse on one or more of paths 3151-315L (e.g., at an analog to digital converter of the path) to sending a second pulse on one or more of paths $313_0$-$313_{L-1}$ (e.g., at an output of a digital-to-analog converter of the path), where the second pulse is based on the first pulse) is significantly less than the coherence time of the qubits of the quantum processor 218. For example, the time to close the feedback loop may be on the order of 100 nanoseconds. It should be noted that each signal path in FIG. 3A may in practice be a set of signal paths for supporting generation of multi-pulse sets (e.g., two signal paths for two-pulse pairs, three signal paths for three-pulse sets, and so on).

In the example implementation shown, the shared circuitry 310 comprises circuitry for exchanging information with the pulser circuits $302_0$-$302_{L-1}$ over signal paths $304_0$-$304_{L-1}$, $306_0$-$306_{L-1}$, and $308_0$-$308_{L-1}$, where each signal path $308_l$ carries outbound pulses generated by the pulser circuit $302_l$, each signal path $306_l$ carries inbound pulses to be processed by pulser circuit $302_l$, and each signal path $304_l$ carries control information such as flag/status signals, data read from memory, data to be stored in memory, data streamed to/from the quantum programming subsystem 202, and data to be exchanged between two or more pulsers $302_0$-$302_L$. Similarly, in the example shown the shared circuitry 310 comprises circuitry for exchanging information with the quantum processor 218 over signal paths $315_0$-$315_{M-1}$ and $313_1$-$313_{K-1}$, where each signal path $315_m$ (m an integer between 0 and M−1) carries inbound pulses from the quantum processor 218, and each signal path $313_k$ (k an integer between 0 and K−1) carries outbound pulses to the quantum processor 218. Additionally, in the example shown the shared circuitry 310 comprises circuitry for exchanging information with the quantum programming subsystem over signal path 311. The shared circuitry 310 may be: integrated with the quantum controller (e.g., on the same field programmable gate array or application specific integrated circuitry or printed circuit board); external to the quantum controller (e.g., on a separate FPGA, ASIC, or PCB connected to the quantum controller via one or more cables, backplanes, in other devices connected to the quantum processor 218, etc.); or partially integrated with the quantum controller and partially external to the quantum controller.

In various implementations, M may be less than, equal to, or greater than L, K may be less than, equal to, or greater than L, and M may be less than, equal to, or greater than K. For example, the nature of some quantum algorithms is such that not all K quantum elements need to be driven at the same time. For such algorithms, L may be less than K and one or more of the L pulsers $302_l$ may be shared among multiple of the K quantum elements circuits. That is, any pulser $302_l$ may generate pulses for different quantum elements at different times. This ability of a pulser $302_l$ to generate pulses for different quantum elements at different times can reduce the required number of pulsers $302_0$-$302_{L-1}$ (i.e., reduce L) required to support a given number of quantum elements (thus saving significant resources, cost, size, overhead when scaling to larger numbers of qubits, etc.).

The ability of a pulser $302_1$ to generate pulses for different quantum elements at different times also enables reduced latency. As just one example, assume a quantum algorithm which needs to send a pulse to quantum element $122_0$ at time T1, but whether the pulse is to be of a first type or second type (e.g., either an X pulse or a Hadamard pulse) cannot be determined until after processing an inbound readout pulse at time T1-DT (i.e., DT time intervals before the pulse is to be output). If there were a fixed assignment of pulsers $302_0$-$302_{L-1}$ to quantum elements of the quantum processor 218 (i.e., if $302_0$ could only send pulses to quantum element $122_0$, and $302_1$ could only send pulses to quantum element $122_1$, and so on), then pulser $302_0$ might not be able to start generating the pulse until it determined what the type was to be. In the depicted example implementation, on the other hand, pulser $302_0$ can start generating the first type pulse and pulser $302_1$ can start generating the second type pulse and then either of the two pulses can be released as soon as the necessary type is determined. Thus, if the time to generate the pulse is That, in this example the example quantum controller 210 may reduce latency of outputting the pulse by $T_{lat}$.

The shared circuitry 310 is thus operable to receive pulses via any one or more of the signals paths $308_0$-$308_{L-1}$ and/or $315_0$-$315_{M-1}$, process the received pulses as necessary for carrying out a quantum algorithm, and then output the resulting processed pulses via any one or more of the signal paths $306_0$-$306_{L-1}$ and/or $313_0$-$313_{K-1}$. The processing of the pulses may take place in the digital domain and/or the analog domain. The processing may comprise, for example: frequency translation/modulation, phase translation/modulation, frequency and/or time division multiplexing, time and/or frequency division demultiplexing, amplification, attenuation, filtering in the frequency domain and/or time domain, time-to-frequency-domain or frequency-to-time-domain conversion, upsampling, downsampling, and/or any other signal processing operation. At any given time, the decision as to from which signal path(s) to receive one or more pulse(s), and the decision as to onto which signal path(s) to output the pulse(s) may be: predetermined (at least in part) in the quantum algorithm description; and/or dynamically determined (at least in part) during runtime of the quantum algorithm based on classical programs/computations performed during runtime, which may involve processing of inbound pulses. As an example of predetermined pulse generation and routing, a quantum algorithm description may simply specify that a particular pulse with predetermined characteristics is to be sent to signal path $313_1$ at a predetermined time. As an example of dynamic pulse determination and routing, a quantum algorithm description may specify that an inbound readout pulse at time T-DT should be analyzed and its characteristics (e.g., phase, frequency, and/or amplitude) used to determine, for example, whether at time T pulser $302_1$ should output a pulse to a first quantum element or to a second quantum element or to determine, for example, whether at time T pulser $302_1$ should output a first pulse to a first quantum element or a second pulse to the first quantum element. In various implementations of the quantum controller 210, the shared circuitry 310 may perform various other functions instead of and/or in addition to those described above. In general, the shared circuitry 310 may perform functions that are desired to be performed outside of the individual pulser circuits $302_0$-$302_{L-1}$. For example, a function may be desirable to implement in the shared circuitry 310 where the same function is needed by a number of pulser circuits from $302_0$-$302_{L-1}$ and thus may be shared among these pulser circuits instead of redundantly being implemented inside each pulser circuit. As another example, a function may be desirable to implement in the shared circuitry 310 where the function is not needed by all pulser circuits $302_0$-$302_{L-1}$ at the same time and/or on the same frequency and thus fewer than L circuits for implementing the function may be shared among the L pulser circuits $302_0$-$302_{L-1}$ through time and/or frequency division multiplexing. As another example, a function may be desirable to implement in the shared circuitry 310 where the function involves making decisions based on inputs, outputs, and/or state of multiple of the L pulser circuits $302_0$-$302_{L-1}$, or other circuits. Utilizing a centralized coordinator/decision maker in the shared circuitry 310 may have the benefit(s) of: (1) reducing pinout and complexity of the pulser circuits $302_0$-$302_{L-1}$; and/or (2) reducing decision-making latency. Nevertheless, in some implementations, decisions affecting multiple pulser circuits $302_0$-$302_{L-1}$ may be made by one or more of the pulser circuits $302_0$-$302_{L-1}$ where the information necessary for making the decision can be communicated among pulser circuits within a suitable time frame (e.g., still allowing the feedback loop to be closed within the qubit coherence time) over a tolerable number of pins/traces.

Figure 3B:
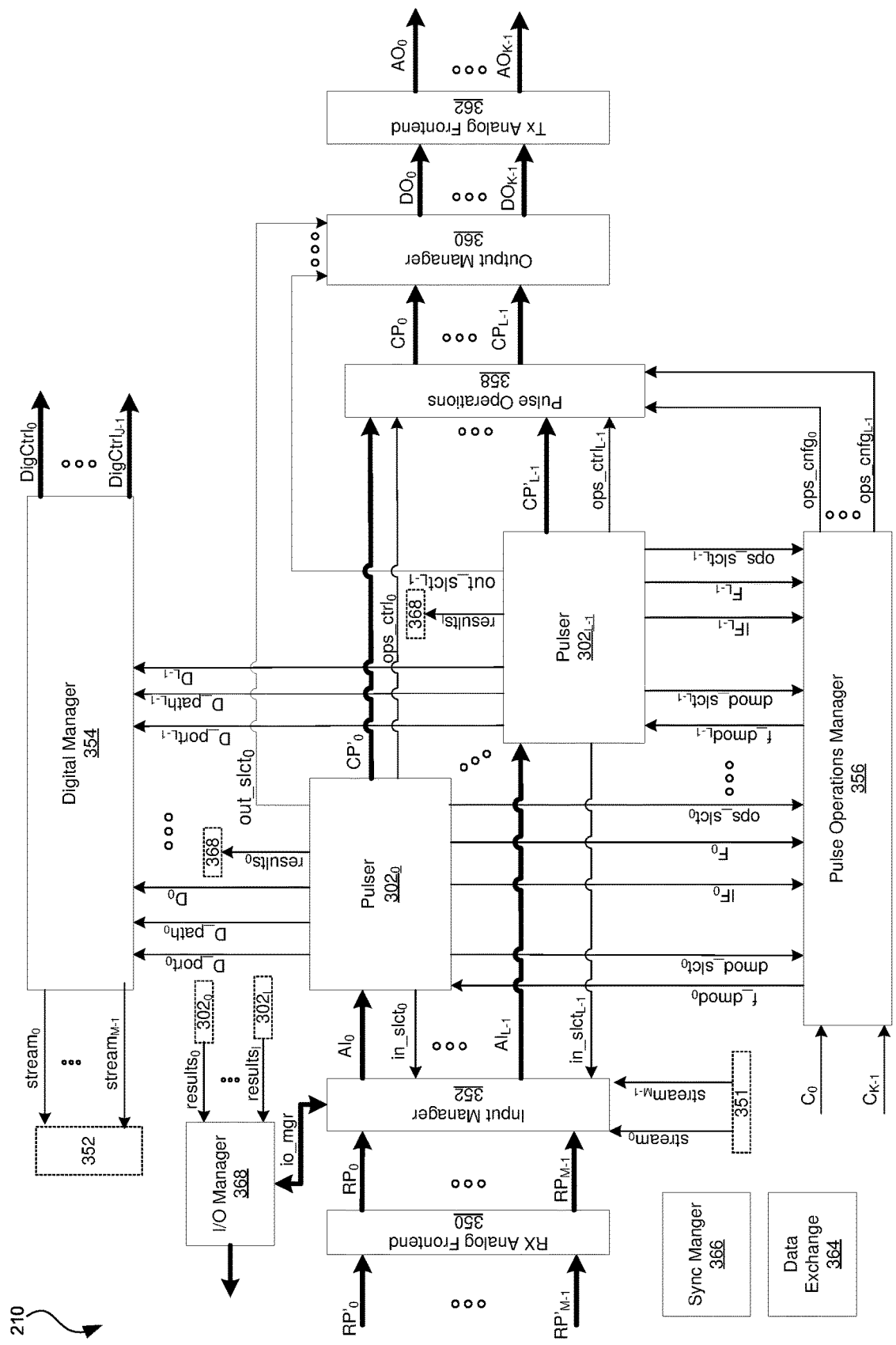
FIG. 3B shows an example implementation of the quantum controller circuitry of FIG. 3A.

FIG. 3B shows an example implementation of the quantum controller of FIG. 2. The example quantum controller shown comprises pulsers $302_1$-$302_{L-1}$, receive analog frontend 350, input manager 352, digital manager 354, pulse operations manager 356, pulse operations circuitry 358, output manager 360, transmit analog frontend 362, data exchange 364, synchronization manager 366, and input/output manager 368. Circuitry depicted in FIG. 3B other than pulser circuits $302_0$-$302_{L-1}$ corresponds to an example implementation of the shared circuitry 310 of FIG. 3A.

The receive analog frontend 350 comprises circuitry operable to concurrently process up to M (an integer≥1) analog inbound signals ($RP'_0$-$RP'_{M-1}$) received via signal paths $315_0$-$315_{M-1}$ to generate up to M concurrent inbound signals ($RP_0$-$RP_{M-1}$) to be output to input manager 352 via one or more signal paths. Although there is shown to be M signals RP and M signals RP', this need not be the case. Such processing may comprise, for example, analog-to-digital conversion, filtering, upconversion, downconversion, amplification, attenuation, time division multiplexing/demultiplexing, frequency division multiplexing/demultiplexing, and/or the like. In various implementations, M may be less than, equal to, or greater than L, and M may be less than, equal to, or greater than K.

The input manager 352 comprises circuitry operable to route any one or more of signals ($RP_0$-$RP_{M-1}$) to any one or more of pulsers $302_0$-$302_{L-1}$ (as signal(s) $AI_0$-$AI_{L-1}$) and/or to other circuits (e.g. as signal io_mgr to I/O manager 368). In an example implementation, the input manager 352 comprises one or more switch networks, multiplexers, and/or the like for dynamically reconfiguring which signals $RP_0$-$RP_{M-1}$ are routed to which pulsers $302_0$-$302_{L-1}$. This may enable time division multiplexing multiple of the signals $RP_0$-$RP_{M-1}$ onto a single signal $AI_1$ and/or time division demultiplexing components (e.g., time slices) of a signal $RP_m$ onto multiple of the signals $AI_0$-$AI_{L-1}$. In an example implementation, the input manager 352 comprises one or more mixers and/or filters for frequency division multiplexing multiple of the signals $RP_0$-$RP_{M-1}$ onto a single signal $AI_1$ and/or frequency division demultiplexing components (e.g., frequency bands) of a signal $RP_m$ onto multiple of the signals $AI_0$-$AI_{L-1}$. The signal routing and multiplexing/demultiplexing functions performed by the input manager 352 enables: a particular pulser $302_1$ to process different inbound pulses from different quantum elements at different times; a particular pulser $302_1$ to process different inbound pulses from different quantum elements at the same time; and multiple of the pulsers $302_0$-$302_{L-1}$ to processes the same inbound pulse at the same time. In the example implementation shown, routing of the signals $RP_0$-$RP_{M-1}$ among the inputs of the pulsers $302_0$-$302_{L-1}$ is controlled by digital control signals in_$slct_0$-in_$slct_{L-1}$ from the pulsers $302_0$-$302_{L-1}$. In another implementation, the input manager may be operable to autonomously determine the appropriate routing (e.g., where the quantum algorithm description includes instructions to be loaded into memory of, and executed by, the input manager 352). In the example implementation, the input manager 352 is operable to rout input signals $RP_0$-$RP_{M-1}$ to the I/O manager 368 (as signal(s) io_mgr), to be sent to the quantum programming subsystem 202. This routing may, for example, be controlled by signals from the digital manager 354. In an example implementation, for each input signal $RP_m$ there is a digital signal, $stream_m$, from the digital manager 354 to the input manager 352 that controls whether $RP_m$ will be sent from the input manager 352 to the I/O manager 368 and from there to the quantum programming subsystem 202.

Each of the pulsers $302_0$-$302_{L-1}$ is as described above with reference to FIG. 3A. In the example implementation shown, each pulsers $302_1$ is operable to generate raw outbound pulses $CP'_1$ ("raw" is used simply to denote that the pulse has not yet been processed by pulse operations circuitry 358) and digital control signals in_$slct_1$, D_$port_1$, D_$path_1$, $D_1$, out_$slct_1$, ops_$ctrl_1$, ops_$slct_1$, $IF_1$, $F_1$, and dmod_$sclt_1$ for carrying out quantum algorithms on the quantum processor 218, and $results_1$ for carrying intermediate and/or final results generated by the pulser $302_1$ to the quantum programming subsystem 202. One or more of the pulsers $302_0$-$302_{L-1}$ may receive and/or generate additional signals which are not shown in FIG. 3A for clarity of illustration. The raw outbound pulses $CP'_0$-$CP'_{L-1}$ are conveyed via signal paths $308_0$-$308_{L-1}$ and the digital control signals are conveyed via signal paths $304_0$-$304_{L-1}$. Each of the pulsers $302_1$ is operable to receive inbound pulse signal $AI_1$ and signal f_$dmod_1$. Pulser $302_1$ may process the inbound signal $AI_1$ to determine the state of certain quantum element(s) in the quantum processor 218 and use this state information for making decisions such as, for example, which raw outbound pulse $CP'_1$ to generate next, when to generate it and what control signals to generate to affect the characteristics of that raw outbound pulse appropriately. Pulser $302_1$ may use the signal f_$dmod_1$ for determining how to process inbound pulse signal $AI_1$. As an example, when Pulse generator $302_1$ needs to process an inbound signal $AI_1$ from quantum element $122_3$, it can send a dmod_$sclt_1$ signal that directs pulse operations manager 356 to send, on f_$dmod_1$, settings to be used for demodulation of an inbound signal $AI_1$ from quantum element $122_3$ (e.g., the pulse operations manager 356 may send the value $\cos(\omega_3 * time\_stamp + \phi_3)$, where $\omega_3$ is the frequency of quantum element $122_3$, time_stamp is amount of time passed since the reference point, for instance the time at which quantum algorithm started running, and $\phi_3$ is the phase of the total frame rotation of quantum element $122_3$, i.e. the accumulated phase of all frame rotations since the reference point).

The pulse operations circuitry 358 is operable to process the raw outbound pulses $CP'_0$-$CP'_{L-1}$ to generate corresponding output outbound pulses $CP_0$-$CP_{L-1}$. This may comprise, for example, manipulating the amplitude, phase, and/or frequency of the raw pulse $CP'_1$. The pulse operations circuitry 358 receives raw outbound pulses $CP'_0$-$CP'_{L-1}$ from pulsers $302_0$-$302_{L-1}$, control signals $ops\_cnfg_0$-$ops\_cnfg_{L-1}$ from pulse operations manager 356, and $ops\_ctrl_0$-$ops\_ctrl_{L-1}$ from pulsers $302_0$-$302_{L-1}$.

The control signal $ops\_cnfg_1$ configures, at least in part, the pulse operations circuitry 358 such that each raw outbound pulse $CP'_1$ that passes through the pulse operations circuitry 358 has performed on it one or more operation(s) tailored for that particular pulse. To illustrate, denoting a raw outbound pulse from pulser 3023 at time T1 as $CP'_{3,T1}$, then, at time T1 (or sometime before T1 to allow for latency, circuit setup, etc.), the digital control signal $ops\_cnfg_3$ (denoted $ops\_cnfg_{3,T1}$ for purposes of this example) provides the information (e.g., in the form of one or more matrix, as described below) as to what specific operations are to be performed on pulse $CP'_{3,T1}$. Similarly, $ops\_cnfg_{4,T1}$ provides the information as to what specific operations are to be performed on pulse $CP'_{4,T1}$, and $ops\_cnfg_{3,T2}$ provides the information as to what specific operations are to be performed on pulse $CP'_{4,T1}$.

The control signal $ops\_ctrl_1$ provides another way for the pulser $302_1$ to configure how any particular pulse is processed in the pulse operations circuitry 358. This may enable the pulser $302_1$ to, for example, provide information to the pulse operation circuitry 358 that does not need to pass through the pulse operation manager 356. For example, the pulser $302_1$ may send matrix values calculated in real-time by the pulser $302_1$ to be used by the pulse operation circuitry 358 to modify pulse $CP'_1$. These matrix values arrive to the pulse operation circuitry 358 directly from the pulser $302_1$ and do not need to be sent to the pulse operation manager first. Another example maybe that the pulser $302_1$ provides information to the pulse operation circuitry 358 to affect the operations themselves (e.g. the signal $ops\_ctrl_1$ can choose among several different mathematical operations that can be performed on the pulse).

The pulse operations manager 356 comprises circuitry operable to configure the pulse operations circuitry 358 such that the pulse operations applied to each raw outbound pulse CP' are tailored to that particular raw outbound pulse. To illustrate, denoting a first raw outbound pulse to be output during a first time interval T1 as $CP'_{1,T1}$, and a second raw outbound pulse to be output during a second time interval T2 as $CP'_{1,T2}$, then pulse operations circuitry 358 is operable to perform a first one or more operations on $CP'_{1,T1}$ and a second one or more operations on $CP'_{1,T2}$. The first one or more operations may be determined, at least in part, based on to which quantum element the pulse $CP_{1,T1}$ is to be sent, and the second one or more operations may be determined, at least in part, based on to which quantum element the pulse $CP_{1,T2}$ is to be sent. The determination of the first one or more operations and second one or more operations may be determined dynamically during runtime.

The transmit analog frontend 362 comprises circuitry operable to concurrently process up to K digital signals $DO_k$ to generate up to K concurrent analog signals $AO_k$ to be output to the quantum processor 218. Such processing may comprise, for example, digital-to-analog conversion, filtering, upconversion, downconversion, amplification, attenuation, time division multiplexing/demultiplexing, frequency division multiplexing/demultiplexing and/or the like. In an example implementation, each of the one or more of signal paths $313_0$-$313_{K-1}$ (FIG. 3A) represents a respective portion of Tx analog frontend circuit 362 as well as a respective portion of interconnect 212 (FIG. 2) between the Tx analog frontend circuit 362 and the quantum processor 218. Although there is one-to-one correspondence between the number of DO signals and the number of AO signals in the example implementation described here, such does not need to be the case. In another example implementation, the analog frontend 362 is operable to map more (or fewer) signals DO to fewer (or more) signals AO.

The output manager 360 comprises circuitry operable to route any one or more of signals $CP_0$-$CP_{L-1}$ to any one or more of signal paths $313_0$-$313_{K-1}$. As just one possible example, signal path $313_0$ may comprise a first path through the analog frontend 362 (e.g., a first mixer and DAC) that outputs $AO_0$ and traces/wires of interconnect 212 that carry signal $AO_0$; signal path $313_1$ may comprise a second path through the analog frontend 362 (e.g., a second mixer and DAC) that outputs $AO_1$ and traces/wires of interconnect 212 that carry signal $AO_1$, and so on. In an example implementation, the output manager 360 comprises one or more switch networks, multiplexers, and/or the like for dynamically reconfiguring which one or more signals $CP_0$-$CP_{L-1}$ are routed to which signal paths $313_0$-$313_{K-1}$. This may enable time division multiplexing multiple of the signals $CP_0$-$CP_{L-1}$ onto a single signal path $313_k$ and/or time division demultiplexing components (e.g., time slices) of a signal $CP_m$ onto multiple of the signal paths $313_0$-$313_{K-1}$. In an example implementation, the output manager 360 comprises one or more mixers and/or filters for frequency division multiplexing multiple of the signals $CP_0$-$CP_{M-1}$ onto a single signal path $313_k$ and/or frequency division demultiplexing components (e.g., frequency bands) of a signal $CP_m$ onto multiple of the signal paths $313_0$-$313_{K-1}$. The signal routing and multiplexing/demultiplexing functions performed by the output manager 360 enables: routing outbound pulses from a particular pulser $302_1$ to different ones of the signal paths $313_0$-$313_{K-1}$ at different times; routing outbound pulses from a particular pulser $302_1$ to multiple of the signal paths $313_0$-$313_{K-1}$ at the same time; and multiple of the pulsers $302_0$-$302_{L-1}$ generating pulses for the same signal path $313_k$ at the same time. In the example implementation shown, routing of the signals $CP_0$-$CP_{L-1}$ among the signal paths $313_0$-$313_{K-1}$ is controlled by digital control signals $out\_slct_0$-$out\_slct_{L-1}$ from the pulsers $302_0$-$302_{L-1}$. In another implementation, the output manager 360 may be operable to autonomously determine the appropriate routing (e.g., where the quantum algorithm description includes instructions to be loaded into memory of, and executed by, the output manager 362).

The digital manager 354 comprises circuitry operable to process and/or route digital control signals ($DigCtrl_0$-$DigCtrl_{J-1}$) to various circuits of the quantum controller 210 and/or external circuits coupled to the quantum controller 210. In the example implementation shown, the digital manager receives, from each pulser $302_1$, (e.g., via one or more of signal paths $304_0$-$304N$-$1$) a digital signal $D_1$ that is to be processed and routed by the digital manager 354, a control signal $D\_port_1$ that indicates to which output port(s) of the digital manager 354 the signal $D_1$ should be routed, and a control signal $D\_path_1$ that controls by which processing path(s) in the digital manger 354 the signal $D_1$ is processed. The digital control signals may be routed to, for example, any one or more controlled circuits (e.g., any of circuits shown in FIG. 3B, switches/gates which connect and disconnect the outputs $AO_0$-$AO_{K-1}$ from the quantum processor 218, external circuits coupled to the quantum controller 210 such as microwave mixers and amplifiers, and/or any other circuitry which can benefit from real-time information from the pulser circuits $302_0$-$302_{L-1}$). Each controlled circuit may require different operations (such as delay, broadening, or digital convolution with a given digital pattern) to be performed on a digital signal $D_1$ intended for that controlled circuit. These operations may be performed by the digital manager 354 and may be specified by control signals $D\_path_0$-$D\_path_{L-1}$ from the pulsers $302_0$-$302_{L-1}$ and/or by configuration settings programmed into the digital manger 354 during initialization and/or calibration of the quantum controller 210. This allows a dynamically-determined routing of signals $D_o$-$D_{L-1}$ such that a digital control signal $D_1$ can be routed to a first one or more of a plurality of controlled circuits during a first time interval and to a second one or more of the plurality of controlled circuits during a second time interval.

The synchronization manager 366 comprises circuitry operable to manage synchronization of the various circuits shown in FIG. 3B. Such synchronization is advantageous in a modular and dynamic system, such as quantum controller 210, where different ones of pulsers $302_0$-$302_{L-1}$ generate, receive, and process pulses to and from different quantum elements at different times. For example, while carrying out a quantum algorithm, a first pulser circuit $302_1$ and a second pulser circuit 3022 may sometimes need to transmit pulses at precisely the same time and at other times transmit pulses independently of one another. In the example implementation shown, the synchronization manager 366 reduces the overhead involved in performing such synchronization.

The data exchange circuitry 364 is operable to manage exchange of data among the various circuits shown in FIG. 3B. For example, while carrying out a quantum algorithm, first pulser circuit $302_1$ and a second pulser circuit 3022 may sometimes need to exchange information. As just one example, pulser $302_1$ may need to share, with pulser 3022, the characteristics of an inbound signal $AI_1$ that it just processed so that pulser 3022 can generate a raw outbound pulse $CP'_2$ based on the characteristics of $AI_1$. The data exchange circuitry 364 may enable such information exchange. In an example implementation, the data exchange circuitry 364 may comprise one or more registers to and from which the pulsers $302_0$-$302_{L-1}$ can read and write.

The I/O manager 368 is operable to route information between the quantum controller 210 and the quantum programming subsystem 202.

Figure 4:
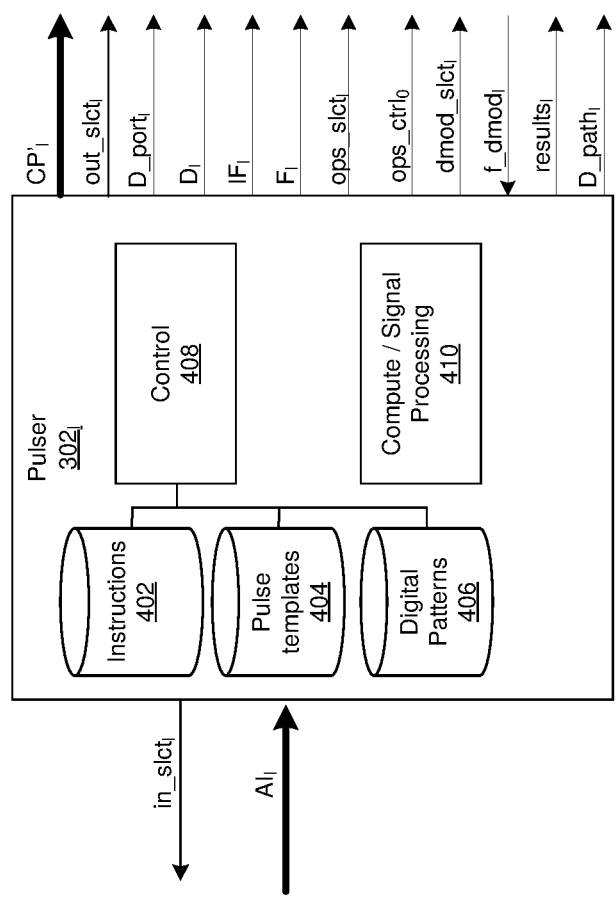
FIG. 4 shows an example implementation of the pulser of FIG. 3B.

FIG. 4 shows an example implementation of the pulser of FIG. 3B. The example pulser $302_1$ shown comprises instruction memory 402, pulse template memory 404, digital pattern memory 406, control circuitry 408, and compute and/or signal processing circuitry (CSP) 410.

The memories 402, 404, 406 may comprise one or more be any type of suitable storage elements (e.g., DRAM, SRAM, Flash, etc.). The instructions stored in memory 402 are instructions to be executed by the pulser $302_1$ for carrying out its role in a quantum algorithm. Because different pulsers $302_0$-$302_{L-1}$ have different roles to play in any particular quantum algorithm (e.g., generating different pulses at different times), the instructions memory 402 for each pulser $302_1$ may be specific to that pulser. For example, the quantum algorithm description 206 from the quantum programming subsystem 202 may comprise a first set of instructions to be loaded (via I/O manager 368) into pulser $302_0$, a second set of instructions to be loaded into pulser $302_1$, and so on. Each pulse template stored in memory 404 comprises a sequence of one or more samples of any arbitrary shape (e.g., Gaussian, sinc, impulse, etc.) representing the pulses to be sent to pulse operation circuitry 358. Each digital pattern stored in memory 406 comprises a sequence of one or more binary values which may represent the digital pulses to be sent to the digital manager 354 for generating digital control signals $DigCtrl_0$-$DigCtrl_{J-1}$.

The control circuitry 408 is operable to execute the instructions stored in memory 402 to process inbound signal $AI_1$, generate raw outbound pulses $CP'_1$, and generate digital control signals $in\_slct_1$, $out\_slct_1$, $D\_port_1$, $D\_path_1$, $D_1$, $IF_1$, $F_1$, $ops\_slct_1$, $ops\_ctrl_1$, $results_1$, and $dmod\_slct_1$. In the example implementation shown, the processing of the inbound signal $AI_1$ is performed by the CSP circuitry 410 and based (at least in part) on the signal $f\_dmod_1$.

The compute and/or signal processing circuitry (CSP) 410 is operable to perform computational and/or signal processing functions, which may comprise, for example, Boolean-algebra based logic and arithmetic functions and demodulation (e.g., of inbound signals $AI_1$).

In operation of an example implementation, generation of a raw outbound pulse $CP'_1$ comprises the control circuitry 408: (1) determining a pulse template to retrieve from memory 404 (e.g., based on a result of computations and/or signal processing performed by the CSP 410); (2) retrieving the pulse template; (3) performing some preliminary processing on the pulse template; (4) determining the values of F, IF, $ops\_slct_1$, and $dmod\_slct_1$ to be sent to the pulse operation manager 356 (as predetermined in the quantum algorithm description and/or determined dynamically based on results of computations and/or signal processing performed by the CSP 410); (5) determining the value of $ops\_ctrl_1$ to be sent to the pulse operation circuitry 358; (6) determining the value of $in\_slct_1$ to be sent to the input manager 352; (7) determining a digital pattern to retrieve from memory 406 (as predetermined in the quantum algorithm description and/or determined dynamically based on results of computations and/or signal processing performed by the CSP 410); (8) outputting the digital pattern as $D_1$ to the digital manager along with control signals $D\_port_1$ and $D\_path_1$ (as predetermined in the quantum algorithm description and/or determined dynamically based on results of computations and/or signal processing performed by the CSP 410); (9) outputting the raw outbound pulse $CP'_1$ to the pulse operations circuitry 358; (10) outputting $results_1$ to the I/O manager.

Figure 5:
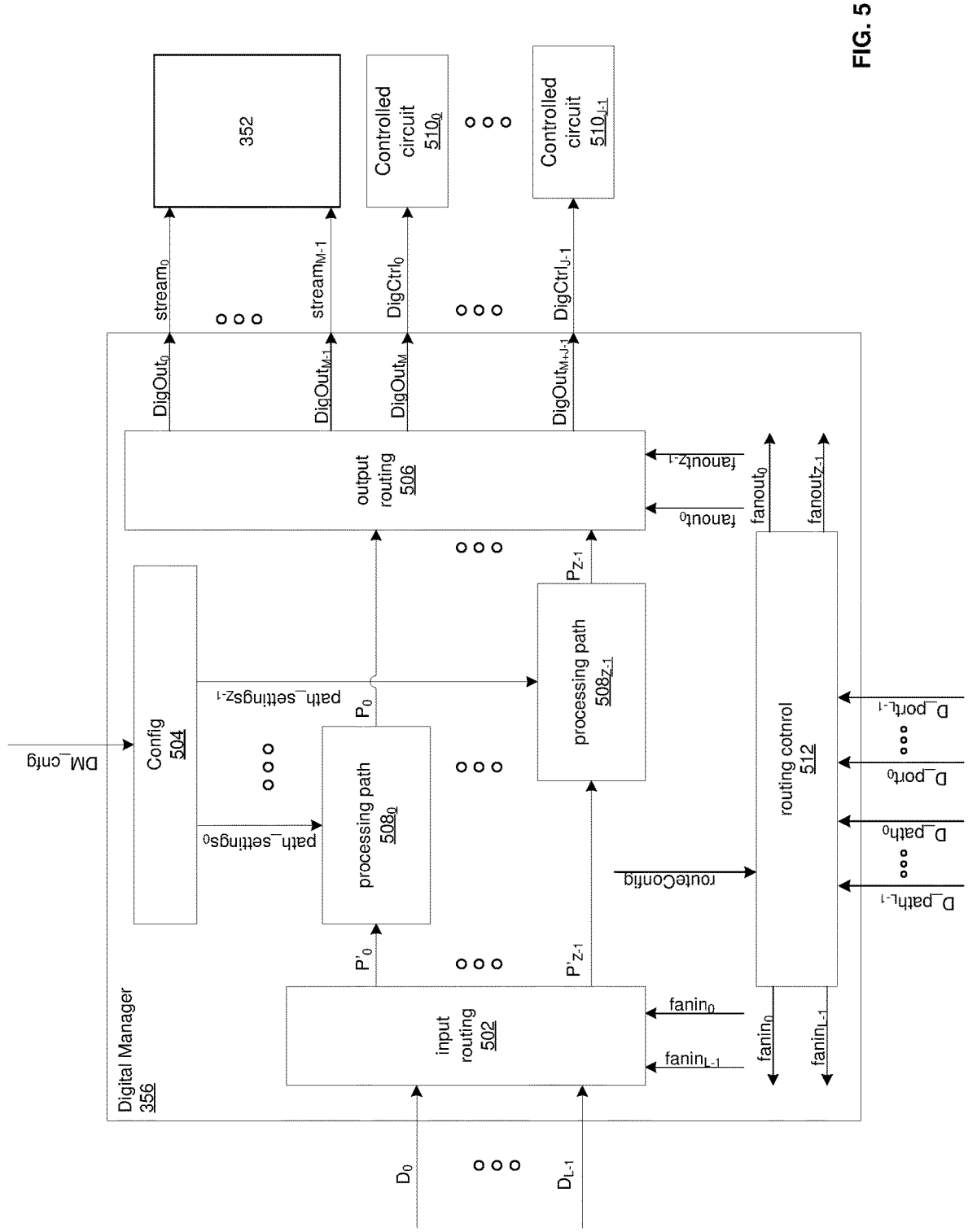
FIG. 5 shows an example implementation of the digital manager of FIG. 3B.

FIG. 5 shows an example implementation of the digital manager of FIG. 3B. Shown in FIG. 5 are the digital manager 356, controlled circuits $510_0$-$510_{J-1}$, and input manager 352.

The example implementation of the digital manager 356 comprises input routing circuit 502, configuration circuit 504, output routing circuit 506, processing paths $508_0$-$508_{Z-1}$ (where Z is an integer), and routing control circuit 512.

The configuration circuit 504 is operable to store configuration settings and use those settings to configure the processing paths $508_0$-$508_{Z-1}$ and/or the routing controller 512. The settings may, for example, be loaded via the signal DM_config as part of the quantum algorithm description provided by quantum programming subsystem 202. The settings may comprise, for example, one or more of: a bitmap on which may be based a determination of which of signals $D_0$-$D_{L-1}$ to route to which of signals $P'_0$-$P'_{Z-1}$ for one or more instructions of a quantum algorithm; a bitmap on which a determination of which processing path outputs $P_0$-$P_{Z-1}$ to route to which of $DigOut_0$-$DigOut_{J+M-1}$ for one or more instructions of a quantum algorithm; and one or more bit patterns which processing paths $508_0$-$508_{Z-1}$ may convolve with one or more of the signals $P'_0$-$P'_{Z-1}$ for one or more instructions of a quantum algorithm.

The input routing circuit 502 is operable to route each of the digital signals $D_0$-$D_{L-1}$ to one or more of the processing paths $508_0$-$508_{Z-1}$. At any given time (e.g., for any particular instruction of every pulser $302_1$ of pulsers $302_0$-$302_L$), the input routing circuit 502 may determine to which of the processing paths $508_0$-$508_{Z-1}$ to rout the signal $D_1$ of signals $D_0$-$D_{L-1}$ based on the signal $fanin_1$ of signals $fanin_0$-$fanin_{L-1}$. That is, for a particular instruction, the digital signal $D_1$ may be routed to any one or more of paths $508_0$-$508_{Z-1}$ based on the value of $fanin_1$ for that instruction. For example, $fanin_1$ may be a Z-bit signal and a state of each bit of $fanin_1$ during a particular instruction may indicate whether $D_1$ is to be routed to a corresponding one of the Z processing paths $508_0$-$508_{Z-1}$ during that instruction. An example implementation of the input routing circuit 502 is described below with reference to FIG. 7.

The output routing circuit 506 is operable to route each of the digital signals $P_0$-$P_{Z-1}$ to one or more of $DigOut_0$-$DigOut_{J+M-1}$ (In the example shown $DigOut_0$-$DigOut_{J+M-1}$ connect to $stream_0$-$stream_{M-1}$, respectively, and $DigOut_M$-$DigOut_{J+M-1}$ connect to $DigCtrl_0$-$DigCtrl_{J-1}$, respectively). At any given time (e.g., for any particular instruction of every pulser $302_1$ of pulsers $302_0$-$302_L$), the output routing circuit 506 may determine to which of $DigOut_0$-$DigOut_{J+M-1}$ to rout the signal $P_1$ of the signals $P_0$-$P_{L-1}$ based on the signal fanout of signals $fanout_0$-$fanout_{Z-1}$. That is, for a particular instruction, the digital signal $P_z$ (z an integer between 0 and Z) may be routed to any one or more of $DigOut_0$-$DigOut_{J+M-1}$ based on the value of $fanout_z$ for that instruction. For example, values of $fanout_z$ may be (J+M-1) bits and a state of each bit of $fanout_z$ during a particular instruction may indicate whether $P_z$ is to be routed to a corresponding one of the J+M-1 signals DigOut during that instruction. An example implementation of the output routing circuit 504 is described below with reference to FIG. 7.

Each of the processing path circuits $508_0$-$508_{Z-1}$ is operable to manipulate a respective one of signals $P'_0$-$P'_{Z-1}$ to generate a corresponding manipulated signal $P_0$-$P_{Z-1}$. The manipulation may comprise, for example, introducing a delay to the signal such that the resulting one or more of $DigOut_0$-$DigOut_{J+M-1}$ reach(es) its/their destination (a controlled circuit 510 and/or input manager 352) at the proper time with respect to the time of arrival of a corresponding quantum control pulse at the corresponding destination. This is illustrated in FIGS. 8A-8C, described below.

Each of the controlled circuits $510_0$-$510_{J-1}$ and input manager 352 is a circuit which, at least some of the time, needs to operate synchronously with quantum control pulses generated by one or more of pulsers $302_0$-$302_{L-1}$ (possibly a reflection/return pulse from a quantum processor in the case of input manager 352). Accordingly, each of the control circuits $510_0$-$510_{J-1}$ receives a respective one of control signals $DigOut_0$-$DigCtrl_{J-1}$ that is synchronized with a respective quantum control pulse. Similarly, input manager 352 receives a plurality of the DigOut signals (one for each stream input).

The routing controller 512 comprises circuitry operable to generate signals $fanin_0$-$fanin_{L-1}$ and $fanout_0$-$fanout_{Z-1}$ based on $D\_path_0$-$D\_path_{L-1}$, $D\_port_0$-$D\_port_{L-1}$, and/or information stored in configuration circuit 504.

Figure 6:
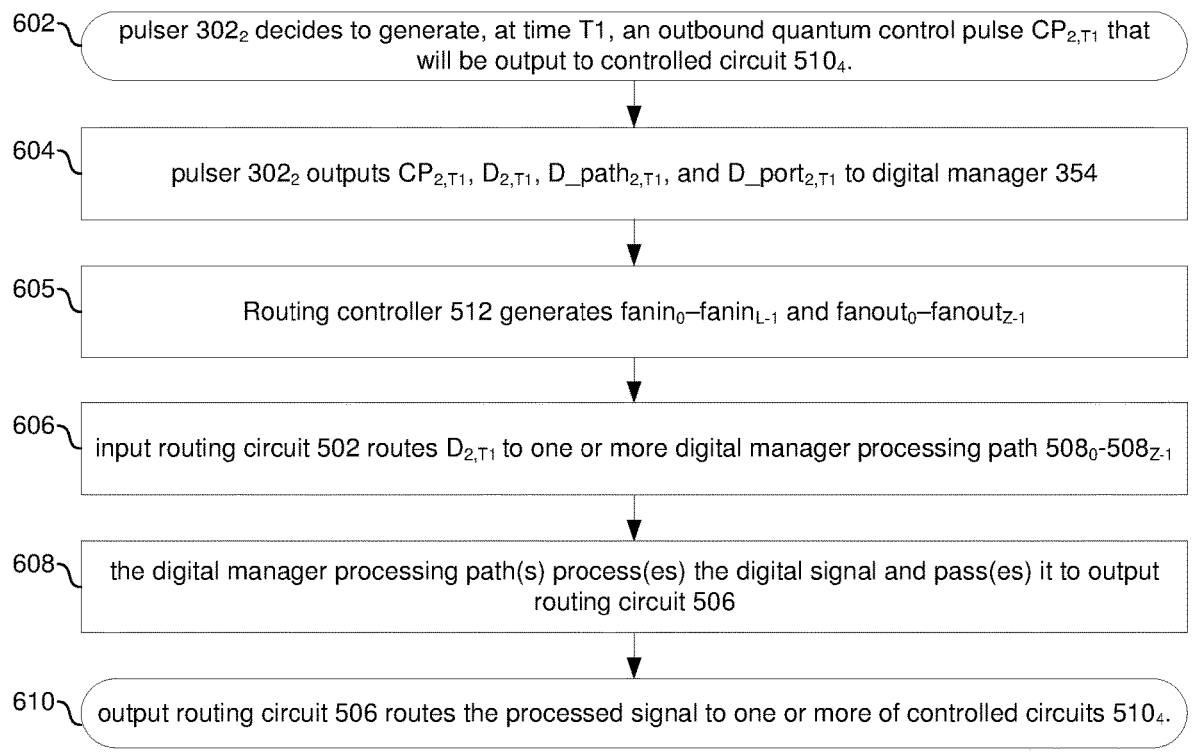
FIG. 6 is a flowchart illustrating digital control signaling in a quantum controller in accordance with an example implementation of this disclosure.

FIG. 6 is a flowchart illustrating digital control signaling in a quantum controller in accordance with an example implementation of this disclosure. Pulser $302_2$ and controlled circuit $510_4$ are arbitrarily chosen for purposes of illustration, but the process could apply to any one or more of the pulsers $302_0$-$302_{L-1}$ and/or controlled circuits $510_0$-$510_{J-1}$ and/or input manager 352.

The process begins with block 602 in which pulser 3022 decides to generate, at time T1, an outbound quantum control pulse $CP_{2,T1}$ that will be output to controlled circuit $510_4$.

In block 604, pulser 3022, at time T1, outputs: (1) quantum control pulse $CP_{2,T1}$; (2) a digital control signal $D_{2,T1}$ for synchronously controlling controlled circuit $510_4$; and (3) digital control signals $D\_path_{2,T1}$ and $D\_port_{2,T1}$ that enable the digital manager circuit 356 to determine how to manipulate $D_{2,T1}$ for conveyance to controlled circuit $510_4$.

In block 605, the routing controller 512 of digital manager 356 generates signals $fanin_0$-$fanin_{L-1}$ and $fanout_0$-$fanout_{Z-1}$ based on $D\_path_0$-$D\_path_{L-1}$, $D\_port_0$-$D\_port_{L-1}$, and/or information stored in configuration circuit 504.

In block 606, input routing circuit 502 routes $D_{2,T1}$ to one or more digital manager processing path $508_0$-$508_{Z-1}$ based on the value of $fanin_{2,T1}$.

In block 608, the one or more of digital manager processing paths $508_0$-$508_{J-1}$ that received $D_{2,T1}$ in block 606, process(es) the digital signal according to configuration settings in configuration circuit 504. In an example implementation, each processing path $508_z$ retrieves, from memory of configuration circuitry 504, a respective one of a plurality of bit patterns that are to be convolved with the signal $D_{2,T1}$ to generate a corresponding one of signals $P_0$-$P_{Z-1}$.

In block 610 output routing circuit 506 routes each of one or more of signals $P_0$-$P_{Z-1}$ as the signal $DigOut_{M+3}$ that is sent to controlled circuit $510_4$ and as one or more of signals $DigOut_0$-$DigOut_{J+M-1}$ based on one or more of signals $fanout_0$-$fanout_{Z-1}$.

Figure 7:
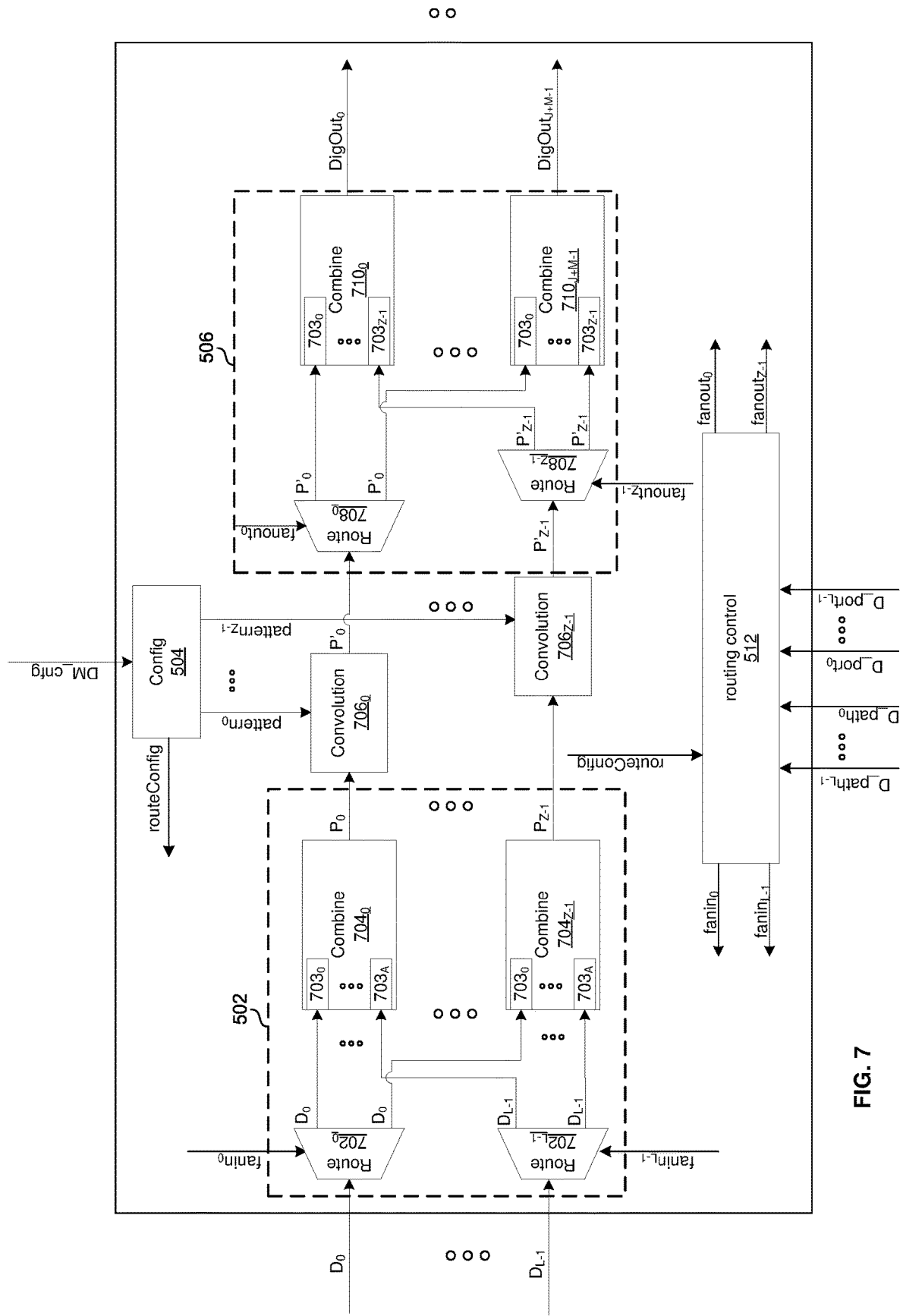
FIG. 7 shows an example implementation of the digital manager of FIG. 3B.

FIG. 7 shows an example implementation of the digital manager of FIG. 3B. The example input routing circuit 502 comprises routing circuits $702_0$-$702_{L-1}$ and combining circuits $704_0$-$704_{L-1}$. The example output routing circuitry 506 comprises circuits routing circuits $708_0$-$708_{Z-1}$ and combining circuits $710_0$-$710_{J-1}$. The example processing path circuits are convolution circuits $706_0$-$706_{Z-1}$.

Each of the routing circuits $702_0$-$702_L$ is operable to route a respective one of signals $D_0$-$D_{L-1}$ to one or more of the combining circuits $704_0$-$704_{L-1}$. To which of combining circuit(s) $704_0$-$704_{Z-1}$ the signal $D_1$ is routed is determined based on the signal $fanin_1$. In an example implementation, each signal $fanin_1$ is a Z-bits signal and, for a $pulser_1$ instruction, the value of bit z of the signal $fanin_1$ determines whether the signal $D_1$ is to be routed to combining circuit 7042 for that instruction. The value of $fanin_1$ may be updated on a per-instruction basis.

Each of combining circuits $704_0$-$704_{L-1}$ is operable to combine up to L of the signals $D_0$-$D_{L-1}$ to generate a corresponding one of signals $P_0$-$P_{Z-1}$. In an example implementation, the combining comprises OR-ing together the values of the up to L signals.

Each of the routing circuits $708_0$-$708_{Z-1}$ is operable to route a respective one of signals $P'_0$-$P'_{Z-1}$ to one or more of the combining circuits $710_0$-$710_{J-1}$. To which of combining circuit(s) $710_0$-$710_{J-1}$ the signal $P'_z$ is routed is determined based on the signal $fanout_z$. In an example implementation, each signal $fanout_z$ is a (J+M-1)-bit signal and the value of bit j+m-1 of the signal $fanout_z$ determines whether the signal $P'_z$ is to be routed to combining circuit $704_{j+m-1}$. In an example implementation the value of $fanout_z$ is preconfigured before the run-time of the quantum algorithm, however, in another implementation it may be updated dynamically (e.g., on a per-instruction basis).

Each combining circuit of combining circuits $710_0$-$710_{J-1}$ is operable to combine up to Z of the signals $P'_0$-$P'_{Z-1}$ (received via inputs $703_0$ to $703_{Z-1}$) to generate a corresponding one of signals $DigOut_0$-$DigOut_{J+M-1}$. In an example implementation, the combining comprises OR-ing together the values of the up to Z signals.

Each convolution circuit $706_z$ is operable to convolve signal $P_z$ with $pattern_z$ to generate signal $P'_z$. In an example implementation, $pattern_z$ is preconfigured before run-time of the quantum algorithm, however, in another implementation it may be updated dynamically. $pattern_z$ may be determined based on: the destination(s) of signal $P_z$ (e.g., to which of controlled circuits 510 and/or input of input manager 352 Pz is intended); characteristics of the corresponding quantum control pulse (e.g., any one or more of its frequency, phase, amplitude, and/or duration); and/or process, temperature, and/or voltage variations.

FIGS. 8A and 8B illustrate problems that can arise when a quantum control pulse needs a digital control signal to condition the signal path traveled by the quantum control pulse in route to its destination.

Shown in FIGS. 8A-8C is pulser $302_0$ generating, at time T1, a quantum control pulse $CP_{0,T1}$ and a corresponding digital control signal $D_{0,T1}$ needed to condition a path along with the quantum control pulse will travel-specifically, in this example, to control controlled circuit $510_0$ as it processes quantum control pulse $CP_{0,T1}$. For purposes of illustration, controlled circuit $510_0$ is assumed to be a gating circuit which, when open permits the pulse to pass through it and when closed prevents the pulse from passing through it. In another example, controlled circuit $510_0$ might be an amplifier, or switch, or measurement device (e.g., oscilloscope, spectrum analyzer, etc.), or a control device (e.g., a voltage source) or any other device that processes the quantum control pulse and $DigOut_0$ may control its operation (e.g., gain of an amplifier, open or closed state of a switch, capture state of a measurement device, output voltage of a voltage source, etc.) which must be triggered or adjusted at precisely the right times to properly amplify $CP_{0,T1}$ without introducing unacceptable distortion.

In FIG. 8A, $D_{0,T1}$ reaches controlled circuit $510_0$ too soon before $CP_{0,T1}$ reaches controlled circuit $510_0$. As a result, controlled circuit $510_0$ opens and closes too soon resulting in distortion (clipping in this example) of $CP_{0,T1}$.

In FIG. 8B, a delay is introduced such that $DigOut_{0,T1}$ (resulting from manipulation of $D_{0,T1}$) reaches controlled circuit $510_0$ at the right time (concurrent with $CP_{0,T1}$). The pulser $302_0$ itself cannot introduce the proper delay to the digital control signal $D_{0,T1}$ because when it finishes outputting the quantum control pulse $CP_{0,T1}$ it must proceed to the next instruction (in which, it may be required for example to generate a new quantum control pulse and a new digital control signal). Moreover, different pulsers may generate digital control signals to be sent to the same controlled circuit and the same pulser may generate digital control signals to different controlled circuits, and thus having each pulsers delaying each digital control signal by the proper amount may add a lot of cost and/or complexity to the pulser $302_0$ and/or the generation of the quantum algorithm description. The digital manager 356 abstracts away the determination of the appropriate delay such that the quantum algorithm description and pulser $302_0$ need not be concerned with it.

In some instances, introduction of the appropriate delay by digital manager 356 may be sufficient. In other instance, however, the ability to further manipulate the digital signal $D_{0,T2}$ may be desired. This is illustrated in FIGS. 8B and 8C using hold time of controlled circuit $510_0$ as one example of a characteristic which the digital manager may be operable to control for. This of course is just one example of how setup and/or hold time of a controlled circuit 510 could distort the pulse if not triggered at the proper time.

In FIG. 8B, although $DigOut_{0,T1}$ (resulting from manipulation of $D_{0,T1}$) is delayed such that it arrives at controlled circuit $510_0$ at precisely the same time as $CP_{0,T1}$, the pulse is nevertheless distorted (clipped in this example) because of hold time requirements of controlled circuit $510_0$. Because characteristics of the controlled circuit $510_0$ (hold time being just one example) can be variable (e.g., over process, voltage, and/or temperature), requiring the pulser $302_0$ to be able to account for such variation may result in a lot of added cost and complexity in the pulser $302_0$ and/or the generation of the quantum algorithm description. The digital manager 356 enables accounting for such variations while also freeing the pulser $302_0$ and quantum algorithm description from having to be concerned with them.

In FIG. 8C digital manager both delays $D_{0,T1}$ as well as spreads it in time by convolving it with a proper digital bit pattern selected based on the characteristics of controlled circuit $510_0$ such that the active time of $DigOut_0$ is spread just the correct amount of time to accommodate setup and hold requirements of controlled circuit $510_0$. The results is that quantum control pulse $CP_{0,T1}$ is faithfully reproduced at the output of controlled circuit $510_0$.

Another important reason for spreading the digital control signal by the digital manager is that elements on the path of the quantum control pulse $CP_{0,T1}$ may affect it in such a way that spreads it in time. For example, a readout resonator to which pulses are sent for receiving information about the state of elements of the quantum processor, may have a response time which will cause the pulse to be spread in time. A simple low pass filter would be another example. The digital control signal must be spread in time to take this into account when controlling the operation of various controlled circuits.

In accordance with an example implementation of this disclosure, a system (e.g., quantum controller 210) comprises a quantum control pulse generation circuit (e.g., $302_0$) and digital signal management circuit (e.g., 356). The quantum control pulse generation circuit is operable to: generate a quantum control pulse (e.g., $CP_{0,T1}$) which can be processed by any of a plurality of controlled circuits (e.g., any of $510_0$-$510_{J-1}$); and generate a first digital signal (e.g., $D_{0,T1}$) which can be routed to any of the plurality of controlled circuits. The digital signal management circuit is operable to: detect, during runtime, to which one or more of the plurality of controlled circuits the first digital signal is to be routed (e.g., detect it is to be routed to $510_0$); manipulate (e.g., process by one or more of the processing paths $508_0$-$508_{Z-1}$) the first digital signal based on the one or more of the plurality of controlled circuits to which the first digital signal is to be routed, wherein the manipulation results in one or more manipulated digital signals (e.g., one or more of $P'_0$-$P'_{Z-1}$); and route the one or more manipulated digital signals to one or more of the plurality of controlled circuits (e.g., $510_0$). For each of the one or more manipulated signals, the manipulation may comprise a delay of the first digital signal by an amount of time determined based on a propagation time of the quantum control pulse from the quantum control pulse generation circuit to one of the one or more controlled circuits (e.g., based on the propagation time of $CP_{0,T1}$ from pulser $302_0$ to controlled circuit $510_0$ in FIG. 8A). The digital signal management circuit may be operable to: delay a first of the one or more manipulated signals intended for a first of the one or more controlled circuits by a first amount of time; and delay a second of the one or more manipulated signals intended for a second of the one or more controlled circuits by a second amount of time (e.g., delay $P'_0$ by a first amount and $P'_1$ by a second amount). For each of the one or more manipulated signals, the manipulation may comprise a convolution of the first digital signal by a digital bit pattern (e.g., convolve $D_0$ with pattern$_1$ in processing path $706_1$). The digital signal management circuit may be operable to select the digital bit pattern from a plurality of digital bit patterns based on the one or more of the plurality of controlled circuits to which the first digital signal is to be routed (e.g., select a first pattern when the first digital signal is to be routed to controlled circuit $510_1$ and a second pattern when the first digital signal is to be routed to controlled circuit $510_2$). The controlled circuits may comprise a gating circuit (e.g., controlled circuit $510_0$ in FIGS. 8A-8C), wherein: when the gating circuit is closed, the quantum control pulse is permitted to propagate to a destination (e.g., quantum processor 218); when the gating circuit is open, the quantum control pulse is prevented from propagating to the destination; and one of the one or more manipulated signals (e.g., $P'_0$) controls whether the gating circuit is closed or open. The quantum pulse generation circuit may be operable to generate a second digital signal (e.g., D_path$_0$), and the detection of to which one or more of the plurality of controlled circuits the first digital signal is to be routed is based on the second digital signal. The second digital signal may a multi-bit signal; and a state of each bit of the second digital signal may determine, at least in part, whether the first digital signal is to be routed to a respective one of the one or more controlled circuits. The digital signal management circuitry comprises a first processing path (e.g., $508_0$) configured to manipulate the first digital signal to generate a first one of the manipulated digital signals to be routed to a first one of the controlled circuits, and may comprise a second processing path (e.g., $508_2$) configured to manipulate the first digital signal to generate a second one of the manipulated digital signals to be routed to a second one of the controlled circuits. The first processing path may be configured to introduce a first delay to the first digital signal, and the second processing path may be configured to introduce a second delay (different than the first delay) to the first digital signal. The first processing path may be configured to convolve the first digital signal with a first bit pattern; the second processing path may be configured to convolve the first digital signal with a second bit pattern (different than the first pattern). The quantum pulse generation circuit may be operable to generate a second digital signal (e.g., D_path$_0$); and the digital signal management circuitry may be operable to select to which of the first processing path and the second processing path to route the first digital signal based on the second digital signal. The second digital signal may comprise a first bit and a second bit (e.g., a two-bit signal with bit0 and bit1), where a state of the first bit of the second digital signal may determine whether the first digital signal is to be processed by the first processing path (e.g., if bit0 is '1' then the first digital signal may be routed to path $508_0$ and if bit0 is '0' then the first digital signal may not be routed to path $508_0$). The controlled circuits may comprise an amplifier, a measurement circuit, a switch, or a control circuit and one of the one or more manipulated signals controls a gain of the amplifier or triggering of the measurement circuit, or opening/closing of the switch, or triggering of the control circuit.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
   a pulser configured to generate a quantum control pulse and one or more control signals, wherein the pulser is one of a plurality of pulsers each configured to emit a shaped analog pulse responsive to a digital pulse control signal; and a pulse operations manager operable to manipulate the one or more control signals, wherein:

the pulse operations manager comprises circuitry operable to configure pulse operations applied to a particular raw outbound pulse such that the manipulation is tailored to the particular raw outbound pulse, and the pulse operations manager operable to send the one or more manipulated control signals to one or more controlled circuits.

2. The system of claim 1, wherein the manipulation comprises a delay according to a propagation time of the quantum control pulse from the pulser to one of the one or more controlled circuits.

3. The system of claim 2, wherein the pulse operations manager is operable to:

delay a first of the one or more control signals intended for a first of the one or more controlled circuits by a first amount of time; and delay a second of the one or more control signals intended for a second of the one or more controlled circuits by a second amount of time.

4. The system of claim 1, wherein the manipulation comprises a convolution of by a digital bit pattern.

5. The system of claim 4, wherein the pulse operations manager is operable to select the digital bit pattern from a plurality of digital bit patterns according to the one or more controlled circuits.

6. The system of claim 5, wherein the pulse operations manager is operable to:

convolve a first control signal of the one or more control signals with a first digital bit pattern of the plurality of digital bit patterns to generate a first manipulated control signal of the one or more manipulated control signals; and convolve the first control signal with a second digital bit pattern of the plurality of digital bit patterns to generate a second manipulated control signal of the one or more manipulated control signals.

7. The system of claim 1, wherein:

the one or more controlled circuits comprise a gating circuit, wherein:

when the gating circuit is closed, the quantum control pulse is permitted to propagate to a destination;

when the gating circuit is open, the quantum control pulse is prevented from propagating to the destination; and at least one of the one or more manipulated control signals controls whether the gating circuit is closed or open.

8. The system of claim 7, wherein the destination is a quantum processor.

9. The system of claim 7, wherein:

the gating circuit is part of an input manager circuit configured to receive a return of the quantum control pulse from a quantum processor; and the destination is a quantum control pulse generation circuit.

10. The system of claim 1, wherein a first control signal of the one or more control signals is routed according to a second control signal of the one or more control signals.

11. The system of claim 10, wherein:

the second control signal is a multi-bit signal;

a state of each bit of the second control signal determines whether the first digital signal is to be routed to a respective one of the one or more controlled circuits.

12. The system of claim 1, wherein:

the pulse operations manager comprises a plurality of processing paths; and each of the plurality of processing paths is configured to manipulate the one or more control signals.

13. The system of claim 12, wherein:

a first processing path of the plurality of processing paths is configured to introduce a first delay to the one or more control signals;

a second processing path of the plurality of processing paths is configured to introduce a second delay to the one or more control signals; and the first delay is different than the second delay.

14. The system of claim 12, wherein:

a first processing path of the plurality of processing paths is configured to convolve the one or more control signals with a first bit pattern;

a second processing path of the plurality of processing paths is configured to convolve the one or more control signals with a second bit pattern; and the first bit pattern is different than the second bit pattern.

15. The system of claim 12, wherein:

the pulse operations manager is operable to select which of the plurality of processing paths to route a first control signal of the one or more control signals according to a second control signal of the one or more control signals.

16. The system of claim 15, wherein:

the second control signal comprises a first bit and a second bit;

a state of the first bit of the second control signal determines whether the first control signal is to be processed by the first processing path; and a state of the second bit of the second control signal determines whether the first control signal is to be processed by the second processing path.

17. The system of claim 1, wherein:

the one or more controlled circuits comprise a switch; and one of the one or more manipulated control signals controls the switch.

18. The system of claim 1, wherein:

the one or more controlled circuits comprise a measurement device; and one of the one or more manipulated control signals triggers the measurement device.

19. The system of claim 1, wherein:

the one or more controlled circuits comprise a control device; and one of the one or more manipulated control signals triggers the operation of the control device.

20. The system of claim 1, wherein:

the one or more controlled circuits comprise an amplifier; and one of the one or more manipulated control signals controls a gain of the amplifier.

* * * * *